(12) United States Patent
Park et al.

(10) Patent No.: US 11,454,835 B2
(45) Date of Patent: Sep. 27, 2022

(54) LIGHT EMISSION DEVICE INCLUDING MAGNETOACTIVE MEMBER, METHOD OF MANUFACTURING THE SAME AND ELECTRONIC APPARATUS INCLUDING LIGHT EMISSION DEVICE

(71) Applicant: UNIVERSITY-INDUSTRY FOUNDATION(UIF), YONSEI UNIVER, Seoul (KR)

(72) Inventors: Cheolmin Park, Seoul (KR); Soyeon Baek, Seoul (KR); Seung Won Lee, Seoul (KR)

(73) Assignee: UNIVERSITY-INDUSTRY FOUNDATION (UIF), YONSEI UNIVERSITY, Seoul (KR)

( * ) Notice: Subject to any disclaimer, the term of this patent is extended or adjusted under 35 U.S.C. 154(b) by 96 days.

(21) Appl. No.: 17/030,687

(22) Filed: Sep. 24, 2020

(65) Prior Publication Data
US 2021/0088815 A1    Mar. 25, 2021

(51) Int. Cl.
*G09F 9/37* (2006.01)
*G02F 1/09* (2006.01)

(52) U.S. Cl.
CPC .............. *G02F 1/091* (2013.01); *G09F 9/375* (2013.01)

(58) Field of Classification Search
CPC .................................. G02F 1/091; G09F 9/375
See application file for complete search history.

(56) References Cited

U.S. PATENT DOCUMENTS 10,092,355 B1 * 10/2018 Hannaford ............. A61B 90/39
2004/0266063 A1 * 12/2004 Montgomery ........ H01L 23/373
257/E23.09

(Continued)

FOREIGN PATENT DOCUMENTS

CN    101872842 A  * 10/2010
JP    2004361430 A  * 12/2004

(Continued)

OTHER PUBLICATIONS

Hongtin Pu and Fengjing Jiang, "Towards high sedimentation stability: magnetorheological fluids based on CNT/Fe3O4 nanocomposites" published on Jun. 29, 2005, Nanotechnology 16 (2005) 1486-1489.

*Primary Examiner* — Towfiq Elahi
(74) *Attorney, Agent, or Firm* — McLean IP Global; Jason Y. Pahng

(57) ABSTRACT

Disclosed are a light emission device including a magnetoactive element, a method of fabricating the same, and an electronic device including the light emission device. The disclosed light emission device may include a light emission layer; a first electrode and a second electrode spaced apart from each other on a first surface side of the light emission layer; and a magnetoactive fluid layer disposed on a second surface side of the light emission layer and having a plurality of nanostructures of which arrangement and distribution is configured to change according to application of a magnetic field. The light emitting properties of the light emission layer may be changed according to the arrangement and distribution of a plurality of nanostructures in the magnetoactive fluid layer. The plurality of nanostructures may include conductive nanowire and magnetic nanoparticle provided on the surfaces of the conductive nanowire.

18 Claims, 25 Drawing Sheets

(56) References Cited

U.S. PATENT DOCUMENTS

2005/0218377 A1* 10/2005 Lawandy ............... C09K 19/52
                                                    252/299.01
2014/0145980 A1*  5/2014 Feng ..................... G06F 3/0446
                                                       345/173
2020/0295293 A1*  9/2020 Menon ................ H01L 51/5221

FOREIGN PATENT DOCUMENTS

| JP | 2011222244 | A | * | 11/2011 | |
| KR | 10-2010-7017768 | | | 10/2010 | |
| KR | 20100115354 | A | * | 10/2010 | |
| KR | 10-2013-0006472 | | | 8/2014 | |
| KR | 10-2015-0167277 | | | 2/2017 | |
| WO | WO-2017135536 | A1 | * | 8/2017 | ................ F21S 4/00 |

* cited by examiner

LIGHT EMISSION DEVICE INCLUDING MAGNETOACTIVE MEMBER, METHOD OF MANUFACTURING THE SAME AND ELECTRONIC APPARATUS INCLUDING LIGHT EMISSION DEVICE

CROSS-REFERENCES TO RELATED APPLICATION

The present application claims the benefit of Korean application no. 10-2019-0118343, filed on Sep. 25, 2019, which is herein incorporated by reference in its entirety.

BACKGROUND OF THE INVENTION

1. Field

The present invention relates to a light emission device and an electronic device, and more particularly, to a light emission device including a magnetoactive element, a method of manufacturing the same and an electronic device having the same.

2. Description of the Related Art

The human-interactive display HID, which may visualize invisible information such as touch, smell and sound, is getting keen attention largely due to its potential in the field of wearable electronic devices combined with Internet of Things (IoT) technology. In particular, as the demand for electronic skin that may artificially mimic the characteristics of human skin sensing pressure, temperature and humidity increases, most HIDs focus on the visualization of these functions, and HID technologies are being developed that may visualize the pressure, temperature or humidity.

The development of a new e-skin capable of sensing a magnetic field, i.e., a magneto-interactive electronic skin is of particular interest because it may mimic the magneto-reception function that some animals and insects have for setting and exploring the direction of travel. In addition, the magneto-interactive electronic skin may potentially be suitable for 3D touchless systems because the magneto-interactive electronic skin may sense objects sensitive to the magnetic field without physical contact on the object.

The technique for visualizing the magnetic field beyond the detection of the magnetic field has the technological potential such as the so-called superhuman interactive display. However, the magnetic-interactive display may be implemented by connecting a display and a magnetic sensor through a conventional microprocessor signal conversion, which requires a high complexity, high cost and interconnection steps. Accordingly, the these products may have problems of difficult miniaturization, high cost and difficulties in fabrication thereof.

The technological object to be achieved by the present invention is to provide a light emission device and a method of manufacturing the light emission device that may be easily manufactured in a small size without a complex and bulky connection structure through a microprocessor as a device capable of sensing and visualizing a magnetic field.

In addition, a technological object to be achieved by the present invention is to provide a light emission device having a non-volatile memory characteristic for a magnetic field, and a method of manufacturing thereof as a device capable of sensing and visualizing the magnetic field.

In addition, a technological object to be achieved by the present invention is to provide an electronic device and/or electronic equipment to which the above-described light emission device is applied. The object to be achieved by the present invention are not limited to the problems mentioned above, and other problems not mentioned will be understood by those skilled in the art from the following description.

SUMMARY OF THE INVENTION

According to an embodiment of the present invention, a light emission device comprising a light emission layer; a first electrode and a second electrode spaced apart from each other on a first surface side of the light emission layer; and a magnetoactive fluid layer disposed on the second surface side of the light emission layer and having a plurality of nanostructures of which arrangement and distribution is configured to change according to application of a magnetic field, and which is configured to change the light emitting properties of the light emission layer according to the arrangement and distribution of nanostructures in the magnetoactive fluid layer is provided.

The plurality of nanostructures may include a conductive nanowire; and magnetic nanoparticle provided on the surface of the conductive nanowire.

The conductive nanowire may include, for example, carbon nanotube.

The magnetic nanoparticle may include, for example, $Fe_3O_4$.

The magnetoactive fluid layer may include an organic solvent and the plurality of nanostructures dispersed in the organic solvent.

After the arrangement and distribution of the plurality of nanostructures are set to the first state by application of the first magnetic field, the first state may be substantially maintained even when the first magnetic field is removed.

The plurality of nanostructures may be configured to form a conductive bridge adjacent to the light emission layer in response to application of a first magnetic field.

The plurality of nanostructures may be configured to eliminate the conductive bridge in response to application of a second magnetic field having a direction opposite to the first magnetic field.

The light emission layer may include an organic material layer and a light emitting element provided in the organic material layer.

The light emission layer may further include a reception element that provides an accommodation space in which the magnetoactive fluid layer is accommodated on the second surface side of the light emission layer.

The light emission device may be an electroluminescence (EL) device driven by an alternating current AC signal.

The light emission device may be a flexible device.

The light emission device may be a wearable device.

According to another embodiment of the present invention, an electronic device including the above-described light emission device is provided.

The electronic device may correspond to at least one of a device sensing a magnetic field, a device visualizing a magnetic field, a device memorizing magnetic field information, and a display device using a magnetic field. For example, the electronic device may include a surgical display device for tracking motion of a magnetic surgical probe.

According to another embodiment of the present invention, a method for manufacturing a light emission device comprising a step for forming a first electrode and a second electrode spaced apart from each other on a substrate; a step for forming a light emission layer on the first and second electrodes; and step for forming a magnetoactive fluid layer including a plurality of nanostructures on the light emission layer, such that arrangement and distribution of the plurality of nanostructures may be changed by application of a magnetic field is provided.

The plurality of nanostructures may include conductive nanowire and magnetic nanoparticle provided on the surfaces of the conductive nanowire.

The method may further include a step for forming a reception element that provides an accommodation space in which the magnetoactive fluid layer is accommodated.

According to embodiments of the present invention, as a device capable of sensing and visualizing a magnetic field, it is possible to implement a light emission device that may be easily manufactured in a small size without a complicated and bulky connection structure through a microprocessor. Further, according to embodiments of the present invention, as a device capable of sensing and visualizing a magnetic field, a light emission device having a non-volatile memory characteristic for a magnetic field may be implemented. The light emission device may be easily manufactured as a flexible device and a wearable device.

According to embodiments of the present invention, an electronic device/electronic equipment to which the above-described light emission device is applied may be implemented.

According to embodiments of the present invention, as a device capable of sensing and visualizing a magnetic field, it is possible to implement a light emission device that may be easily manufactured in a small size without a complicated and bulky connection structure through a microprocessor. Further, according to embodiments of the present invention, as a device capable of sensing and visualizing a magnetic field, a light emission device having a non-volatile memory characteristic for a magnetic field may be implemented. The light emission device may be easily manufactured as a flexible device and a wearable device.

According to embodiments of the present invention, an electronic device/electronic equipment to which the above-described light emission device is applied may be implemented.

DETAILED DESCRIPTION OF THE INVENTION

Figure 1:
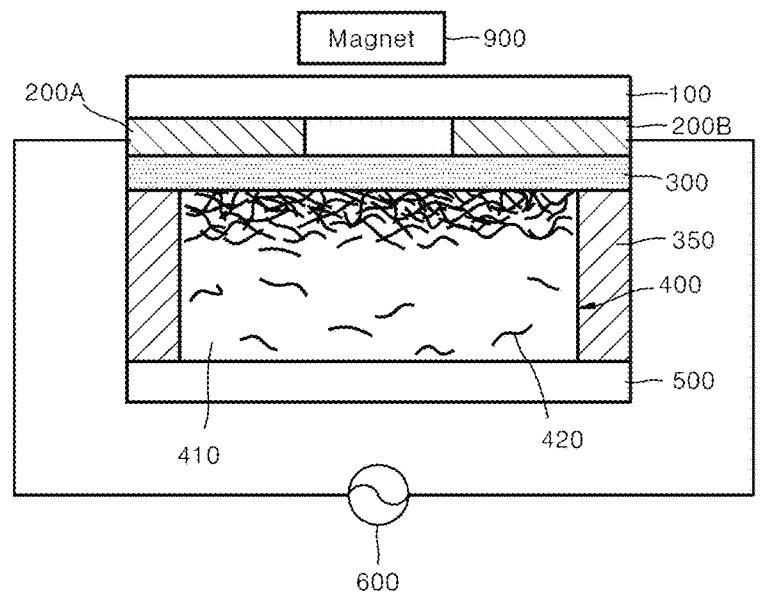
FIG. 1 is a cross-sectional diagram showing a light emission device including a magnetoactive element according to an embodiment of the present invention.

Hereinafter, the embodiments of the present invention will be described in detail with reference to the accompanying drawings.

The embodiments of the present invention to be described below are provided to more clearly explain the present invention to those skilled in the art, and the scope of the present invention is not limited by the following examples, and the following embodiments may be modified in many different forms.

The terminology used herein is used to describe a specific embodiment and is not intended to limit the present invention. As used herein, the term, a singular form may include plural forms unless the context clearly indicates otherwise. Also, as used herein, the terms, "comprise" and/or "comprising" specify the mentioned types, steps, numbers, operations, elements, elements and/or the presence of these groups, and does not exclude the presence or addition of one or more other types, steps, numbers, operations, elements, elements and/or existence or groups of these. In addition, the term, "connection" as used herein not only means a connection wherein some elements are directly connected, but also means an indirect connection wherein other elements are further interposed between the elements.

In addition, when a element is referred to as being "on" another element in the present specification, this includes not only the case that one element abuts another element, but also the case that there is another element disposed between the two elements. The term, "and/or" as used herein includes any one of the listed items, and all combinations of any one or more of the items. In addition, the terms, "about", "substantially", and the like used in the present specification are used in terms of category of their numerical value or a degree, or in a sense close to them, in consideration of unique manufacturing and material tolerances, and accurate or absolute figures provided to help understand the present application are used to prevent infringers from unfairly using the stated disclosure.

Hereinafter, the embodiments of the present invention will be described in detail with reference to the accompanying drawings. The size or thickness of the regions or parts illustrated in the accompanying drawings may be exaggerated for clarity and convenience of description. Throughout the detailed description, the same reference numerals denote the same components.

FIG. 1 is a cross-sectional diagram showing a light emission device including a magnetoactive element according to an embodiment of the present invention.

Referring to FIG. 1, a light emission device according to the present embodiment may include a light emission layer 300, first and second electrodes 200A and 200B spaced apart from each other on a first surface side of the light emission layer 300, and a magnetoactive fluid layer 400 disposed on a second surface side of the light emission layer 300. The first and the second electrodes 200A and 200B may be disposed on any one of an upper surface and a lower surface of the light emission layer 300, for example, on the upper surface of the light emission layer 300, and the magnetoactive fluid layer 400 may be disposed on the other surface of the light emission layer 300, for example, on the lower surface of the light emission layer 300.

The first and the second electrodes 200A and 200B may be transparent electrodes. For example, the first and the second electrodes 200A and 200B may be formed of transparent conductive oxide (TCO). For example, the first and the second electrodes 200A and 200B may be formed of indium tin oxide (ITO). However, the materials of the first and the second electrodes 200A and 200B are not limited to the above materials and may be variously changed.

The first and the second electrodes 200A and 200B may be disposed to be spaced apart from each other in a horizontal direction (i.e., in-plane direction) on one surface of the light emission layer 300.

The light emission layer 300 may include a material having an electroluminescence property capable of emitting light by an electric field. For example, the light emission layer 300 may include a material that may emit light by an alternating current AC signal. The light emission layer 300 may include an organic material layer and a light emitting element (i.e., a light emitting component) provided in the organic material layer. In one example, the light emission layer 300 may include a ZnS:Cu material as a light emitting element (a light emitting component) in the PVDF-TrFE-CFE layer (an organic material layer). A plurality of particles composed of ZnS doped with Cu may be embedded in the PVDF-TrFE-CFE layer. Here, PVDF-TrFE-CFE represents poly(vinylidene fluoride-trifluoroethylene-chlorofluoroethylene). Instead of the PVDF-TrFE-CFE layer, a PDMS layer, that is, a poly(dimethylsiloxane) layer may be used as the organic material layer. In other words, the ZnS:Cu material may be embedded in the PDMS layer and may be used as the light emission layer 300. In addition, other materials may be used in place of the ZnS:Cu material as a light emitting element (a light emitting component). For example, a pre-determined metal or a metal oxide such as ZnO may be used as the light emitting element (a light emitting component). The light emission layer 300 may emit light by an alternating current AC signal and may also have flexiblity.

The magnetoactive fluid layer 400 may include a plurality of nanostructures 420. The magnetoactive fluid layer 400 may include a predetermined organic solvent 410, and a plurality of nanostructures 420 dispersed in the organic solvent 410. The arrangement and distribution of the plurality of nanostructures 420 in the magnetoactive fluid layer 400 may be changed by a magnetic field applied from an external space. For example, the arrangement and distribution of the plurality of nanostructures 420 may be changed by a magnetic field applied from the magnetic body 900 outside the light emission device to the magnetoactive fluid layer 400. The light emitting properties of the light emission layer 300 may be changed according to the arrangement and distribution of the plurality of nanostructures 420 in the magnetoactive fluid layer 400. In this regard, the light emission device according to the present embodiment may be used as a device which may sense a magnetic field and also visualize the magnetic field. This characteristics will be described in more detail later.

The light emission device of this embodiment may further include a reception layer, that is, a reception element 350, which provides a reception space in which the magnetoactive fluid layer 400 is accommodated on the second surface side of the light emission layer 300. The magnetoactive fluid layer 400 may be accommodated in the accommodation space of the reception element 350. The reception element 350 may have a so-called square segmented structure, and may serve as a kind of spacer that provides a storage space for the magnetoactive fluid layer 400. The reception element 350 may be formed of, for example, an acrylic film having strong adhesion force. However, this is only an example, and the material of the reception element 350 may vary depending on the circumstances.

In addition, the light emission device of this embodiment may further include a cover layer 500 for sealing the magnetoactive fluid layer 400. The cover layer 500 may be provided on one side (on lower surface in the drawing) of the reception element 350 to prevent separation or evaporation of the magnetoactive fluid layer 400 and protect the magnetoactive fluid layer 400. The cover layer 500 may be formed of, for example, a polymer material such as polyethylene terephthalate (PET), but the material is not limited thereto, and the type of the applied material may be variously changed.

In addition, the light emission device of the present embodiment may further include a substrate 100 on which the electrodes 200A and 200B are provided. In FIG. 1, the substrate 100 may be present on the upper surface side of the electrodes 200A and 200B. The substrate 100 may be made of, for example, a polymer material such as PET, but the material composition may be variously changed. The substrate 100 may be referred to as a first substrate, and the opposite cover layer 500 may be referred to as a second substrate.

In addition, the light emission device of this embodiment may further include a power supply 600 connected between the first electrode 200A and the second electrode 200B. A predetermined alternating current AC signal may be applied between the first and the second electrodes 200A and 200B through the power supply 600. An AC voltage may be applied between the first and the second electrodes 200A and 200B through the power supply 600, and the light emission device may be driven by an AC electric field generated by the AC voltage.

The light emission device of this embodiment may be a flexible device. Therefore, the light emission device may be easily implemented as a wearable device.

Figure 2:
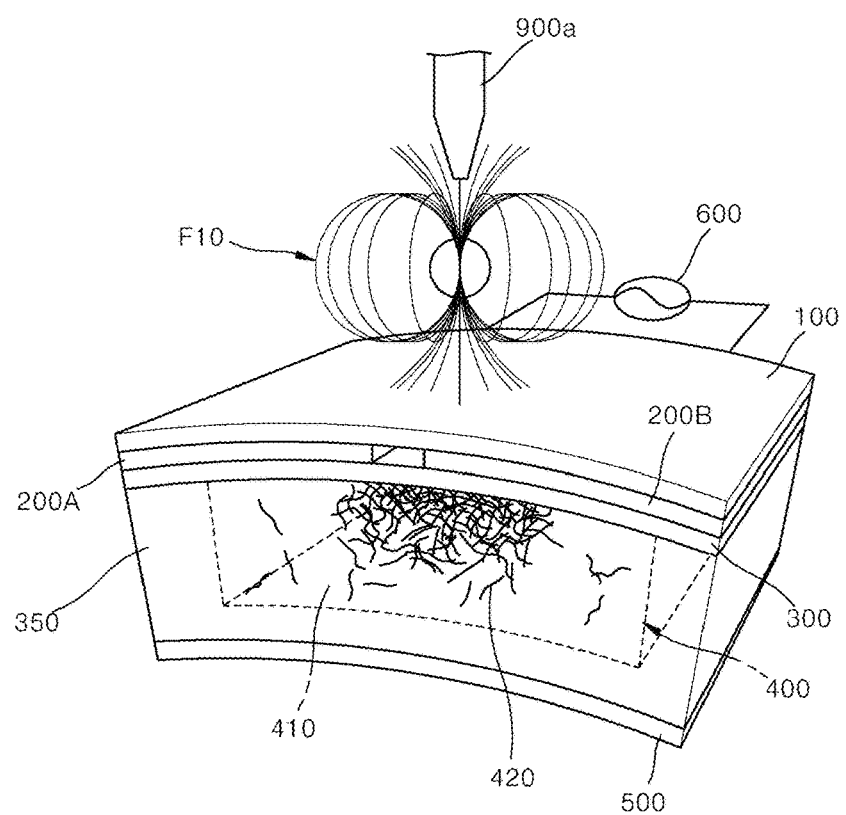
FIG. 2 is a perspective view showing a case in which a magnetic field is applied to a light emission device according to an embodiment of the present invention.

FIG. 2 is a perspective view showing a case in which a magnetic field is applied to a light emission device according to an embodiment of the present invention. The light emission device in FIG. 2 has a configuration corresponding to the light emission device described in FIG. 1. The light emission device of FIG. 2 may be a flexible device.

Referring to FIG. 2, in a state in which a predetermined driving voltage is applied between the first and the second electrodes 200A and 200B through the power supply unit 600, a magnetic field F10 may be applied to the magnetoactive fluid layer 400 using the magnetic body 900a. The arrangement and distribution of the plurality of nanostructures 420 in the magnetoactive fluid layer 400 may be changed by the magnetic field F10. For example, the plurality of nanostructures 420 may form a conductive bridge adjacent to (or in contact with) the light emission layer 300. At least a part of the plurality of nanostructures 420 may be gathered at a portion adjacent to the light emission layer 300 by a magnetic field F10 to form a network (i.e., a percolation network) structure, and a conductive bridge may be created by the network structure. The above-described conductive bridge may serve as a kind of floating electrode. In addition, the above-described conductive bridge may be a conductive channel, and may serve as a kind of magnetic field gate. When the conductive bridge is formed, a relatively strong electric field may be generated in a direction perpendicular between the conductive bridge and the first electrode 200A, and between the conductive bridge and the second electrode 200B. Accordingly, relatively strong electroluminescence EL characteristics may be exhibited in a portion of the light emission layer 300 provided between the conductive bridge and the first and the second electrodes 200A and 200B.

Depending on the intensity, direction, location, etc. of the magnetic field F10 applied from outside, the state in which the arrangement and distribution of the plurality of nanostructures 420 may be set may be changed, and consequently, the light emitting properties of the light emission layer 300 may be varied.

Figure 3:
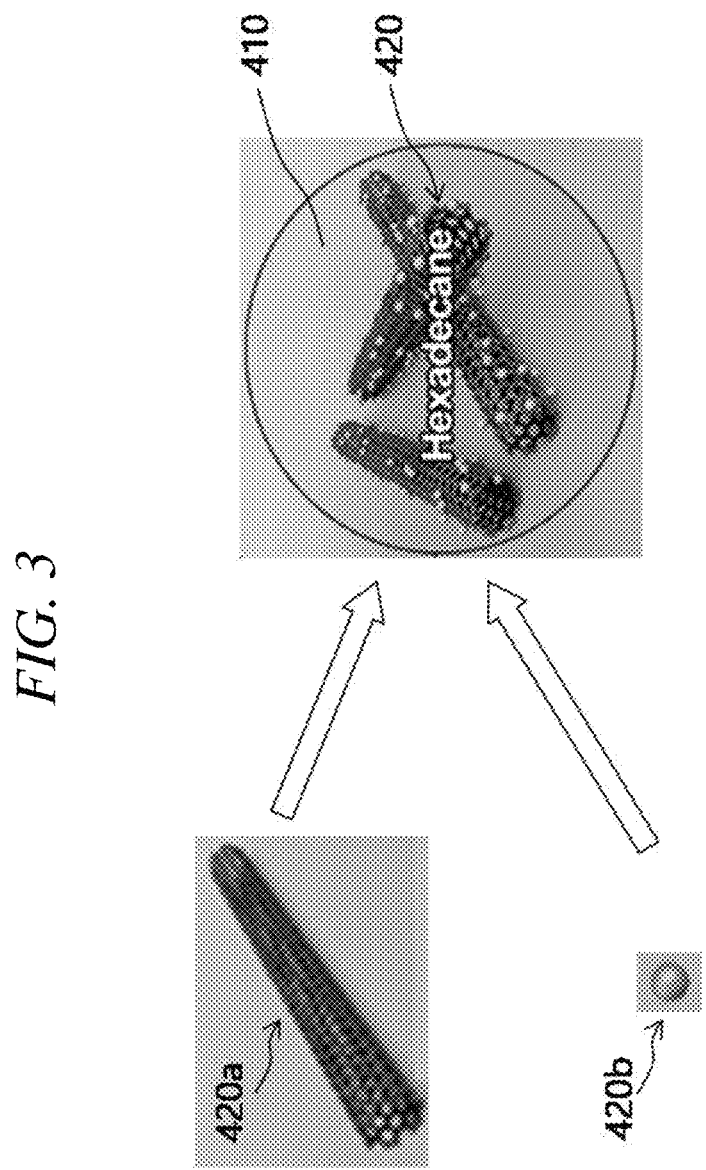
FIG. 3 is a perspective view for illustratively explaining the configuration of a nanostructure that may be applied to a light emission device according to an embodiment of the present invention.

FIG. 3 is a perspective view for illustratively explaining the configuration of a nanostructure that may be applied to a light emission device according to an embodiment of the present invention.

Referring to FIG. 3, the nanostructure 420 may include a conductive nanowire 420a and a plurality of magnetic nanoparticle 420b provided on the surface of the conductive nanowire 420a. The conductive nanowire 420a may include, for example, carbon nanotube(CNT). As a specific example, the conductive nanowire 420a may be a multi-walled carbon nanotube(MWNT). The magnetic nanoparticle 420b may be formed of a ferrite(Fe)-based magnetic material. The magnetic material of the magnetic nanoparticle 420b may have substantial superparamagnetic properties or properties similar to the superparamagnetic properties. For example, the magnetic nanoparticle 420b may include iron oxide having superparamagnetism. As a specific example, the magnetic nanoparticle 420b may include $Fe_3O_4$ or may be composed of $Fe_3O_4$. However, the material of the conductive nanowire 420a and the material of the magnetic nanoparticle 420b are not limited to the above substances, and may be variously varied. For example, the conductive nanowire 420a may be formed of a predetermined metal, and the magnetic nanoparticle 420b may be composed of materials other than $Fe_3O_4$. Since the nanostructure 420 is a combination of a plurality of different materials, it may be explained that the nanostructure 420 has a kind of heterostructure.

The magnetoactive fluid layer 400 described in FIG. 1 may include a plurality of nanostructures 420 dispersed in the organic solvent 410. The organic solvent 410 may be a dispersion medium having dispersibility and affinity for a plurality of nanostructures 420. In an example, the organic solvent 410 which is not so high polarity or dielectric may be selected not to weaken operating performance of the light emission device. As one example, the organic solvent 410 may be a non-polar solvent such as hexadecane (i.e., n-hexadecane). However, the material of the organic solvent 410 is not limited to this and may be variously varied.

Figure 4:
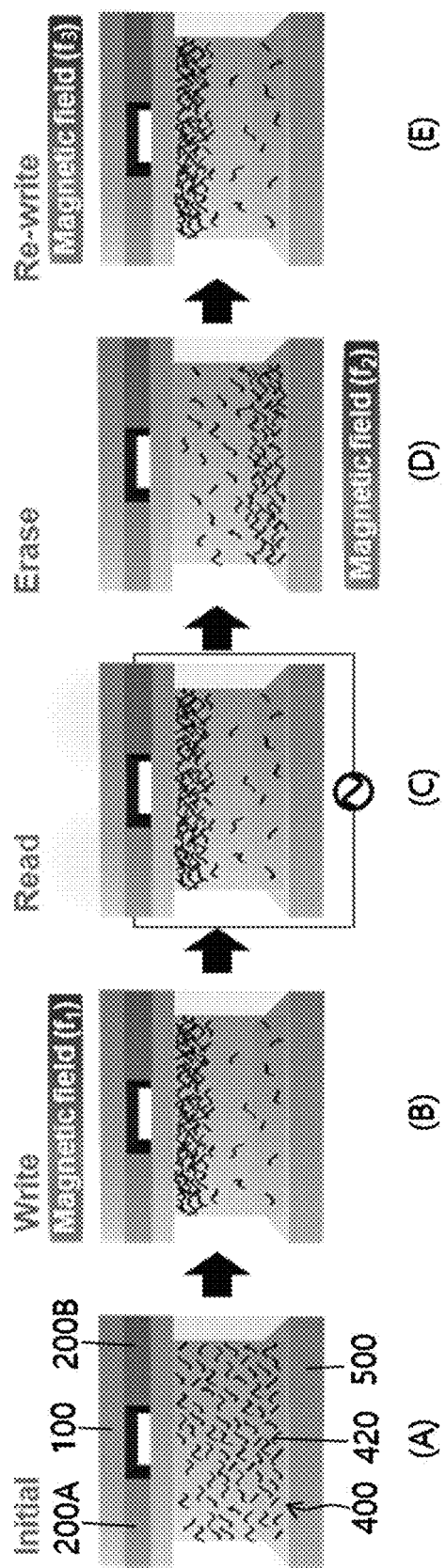
FIG. 4 is a diagram for explaining an operating principle of a light emission device according to an embodiment of the present invention.

FIG. 4 is a diagram for explaining an operating principle of a light emission device according to an embodiment of the present invention.

Referring to FIG. 4, step A may be in an initial state, and at this time, the plurality of nanostructures 420 may be relatively well dispersed in the magnetoactive fluid layer 400.

In step B, the first magnetic field f1 may be applied to the magnetoactive fluid layer 400, and the arrangement and distribution of the plurality of nanostructures 420 may be changed by the first magnetic field $f_1$. For example, the plurality of nanostructures 420 may form a conductive bridge in an area adjacent to the light emission layer 300. The conductive bridge may function to electrically or magnetically connect the first and the second electrodes 200A and 200B with the light emission layer 300 therebetween.

When the conductive bridge is formed by the first magnetic field $f_1$ in step B, even if the first magnetic field $f_1$ is removed, the conductive bridge may be substantially maintained. In other words, after the arrangement and distribution of the plurality of nanostructures 420 are set to a first state by application of the magnetic field, the first state may be substantially maintained even when the magnetic field is removed. A network of the plurality of nanostructures 420, which may be referred to as a percolation network) may be maintained unchanged by collective physical fixation and dielectrophoretic effects, even when the magnetic field is removed. Unlike superparamagnetic iron oxide particle having a single domain size of about 10 nm, the network, i.e., the percolation network may behave like a multi-domain iron oxide cluster. Therefore, it is assumed that the network, i.e., the percolation network may have weak residual magnetism and maintain the network structure without a redistribution of the percolation by brown motion even when the applied magnetic field is removed. Therefore, non-volatile memorizing of an input magnetic field information may be possible. The magnetic field information may be easily stored, and the stored information may be read or reproduced even when the input magnetic field is removed. Setting the arrangement and distribution of a plurality of nanostructures 420 as the first state by applying a magnetic field may be referred to as a kind of 'write' or 'programming' operation.

Step C is a 'read' step. In step C, while the first magnetic field $f_1$ is removed, a recorded or programmed magnetic field information may be read or reproduced. The information of the magnetic field may be regarded as being stored or recorded as a format of the arrangement or distribution of the plurality of nanostructures 420, for example, the density of the network, i.e., percolation network formed by the nanostructures 420. The stored magnetic field information may be reproduced in the form of light, i.e., visible light generated by the light emission layer 300 by applying a predetermined electrical signal, for example, alternating voltage signal between the first and second electrodes 200A and 200B through the power supply 600.

Step D represents the step for 'erasing' the stored magnetic field information. The plurality of nanostructures 420 may be configured to eliminate the conductive bridge in response to application of a second magnetic field $f_2$ having a direction opposite to the first magnetic field $f_1$. In other words, by applying a second magnetic field $f_2$ having a direction opposite to the first magnetic field $f_1$, a network structure in which nanostructures 420 are formed in an area adjacent to the light emission layer 300, i.e., the conductive bridge may be eliminated. In this case, the plurality of nanostructures 420 may be relatively randomly dispersed in the magnetoactive fluid layer 400.

Step E represents a 'rewrite' step. In this step, a third magnetic field $f_3$ may be applied to the magnetoactive fluid layer 400, and the arrangement and distribution of the plurality of nanostructures 420 may be changed by the third magnetic field $f_3$. Similar to step B, the plurality of nanostructures 420 may form a conductive bridge in an area adjacent to the light emission layer 300. Characteristics such as the density of the conductive bridge may be determined by the strength of the third magnetic field $f_3$ and the like. Therefore, the light emission device according to the present embodiment may implement a rewritable memory function.

An operation method of the light emission device according to the embodiment described with reference to FIG. 4 may be summarized as follows.

After preparing the light emission device according to the embodiment, the first magnetic field may be applied to the magnetoactive fluid layer to set the arrangement and distribution of the plurality of nanostructures to a first state. This may be referred to as a step for recording an information of the first magnetic field.

A predetermined electrical signal may be applied between the first and the second electrodes of the light emission device to reproduce or read the recorded information of the first magnetic field. During a reproduction or read operation, the first magnetic field may be removed.

Next, the arrangement and distribution of the plurality of nanostructures set in the first state may be removed or erased by applying a second magnetic field in an opposite direction to the first magnetic field to the magnetoactive fluid layer. This may be referred to as a step for erasing the first magnetic field information.

Then, a third magnetic field may be applied to the magnetoactive fluid layer to set the arrangement and distribution of the plurality of nanostructures to a second state. This may be called as a rewriting step.

As a magnetic field is applied to the light emission device according to the embodiment, the electrical characteristics of the light emission device may also be changed. For example, the impedance of the light emission device, that is, an AC resistance may be changed by a magnetic field applied from an outside of the light emission device. The reason for the change of the impedance is that, as the nanostructures 420 of the magnetoactive fluid layer 400 form a predetermined network structure, for example, a conductive bridge, by applying a magnetic field, such a network structure can changes the impedance between the first and second electrodes 200A and 200B of the light emission device. This will be described in more detail with reference to FIG. 5.

Figure 5:
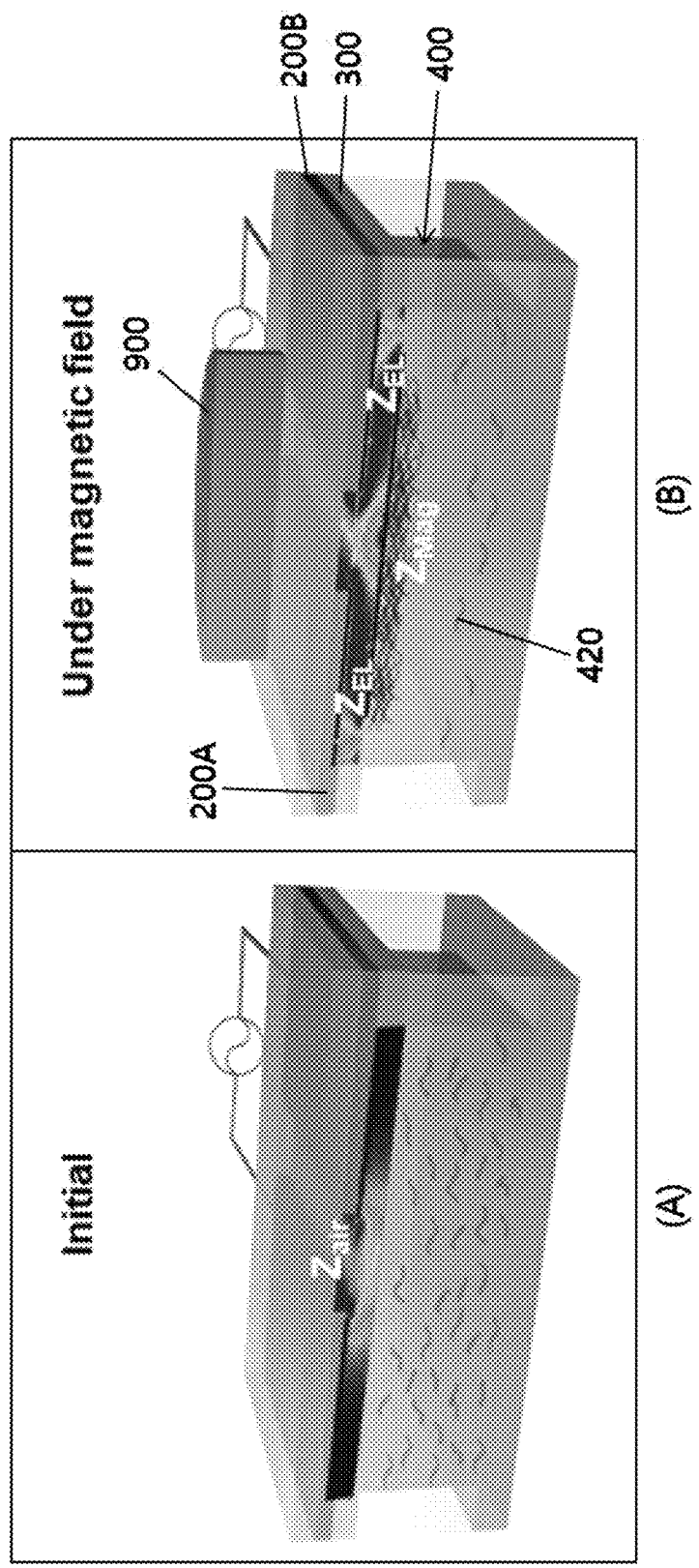
FIG. 5 is a conceptual diagram schematically explaining a change in electrical characteristics by applying a magnetic field of a light emission device according to an embodiment of the present invention.

FIG. 5 is a conceptual diagram schematically explaining a change in electrical characteristics by applying a magnetic field of a light emission device according to an embodiment of the present invention. FIG. 5A shows the initial state, and FIG. 5B shows the state in which a magnetic field is applied.

Referring to FIG. 5A, in the initial state, since the first electrode 200A and the second electrode 200B are spaced apart in the horizontal direction, and the nanostructures 420 do not form a conductive bridge, the impedance between the first electrode 200A and the second electrode 200B may be considerably high. At this time, an initial capacitance between the first electrode 200A and the second electrode 200B may be determined by an air layer between the first electrode 200A and the second electrode 200B. That is, the initial capacitance between the first electrode 200A and the second electrode 200B may be determined by the capacitance of the air layer. Reference numeral $Z_{air}$ denotes an impedance component generated by the air layer.

Referring to FIG. 5B, when the magnetic field is applied by the magnetic body 900, the nanostructures 420 form a network structure, i.e., a conductive bridge. In this case, the impedance of the light emission device may be determined by the capacitance between each of the two electrodes 200A, 200B and the conductive bridge, and the resistance of the conductive bridge. A reference numeral $Z_{EL}$ denotes the impedance component of a region of the light emission layer 300 adjacent to the electrodes 200A and 200B, and $Z_{Mag}$ denotes an impedance component due to the conductive bridge. The density, type, or electromagnetic properties of the conductive bridge may be changed by the applied magnetic field. Therefore, it may be mentioned that the impedance of the light emitting element may be changed by the applied magnetic field. The impedance of the entire light emission device may be significantly affected depending on whether a network of the nanostructures 420 are formed or not, and the characteristics of the formed network. Therefore, the magnetic field may be sensed by measuring the change in impedance of the light emission device.

The change in impedance due to the magnetic field may change the electric field applied to the light emission layer 300 when the light emission device is operated. In other words, when the impedance of the light emission device is changed, the intensity or the type of the electric field applied to the light emission layer 300 may be changed. In particular, since the light-emitting layer 300 may emit light by an AC electric field generated by an AC voltage, the light-emitting characteristics of the light emission layer 300 may be greatly influenced by an impedance change due to the magnetic field. For example, when the nanostructures 420 form a conductive bridge and thus, the impedance decreases, the EL(electroluminescence) intensity of the light emission layer 300 in the corresponding area may be significantly increased.

Figure 6:
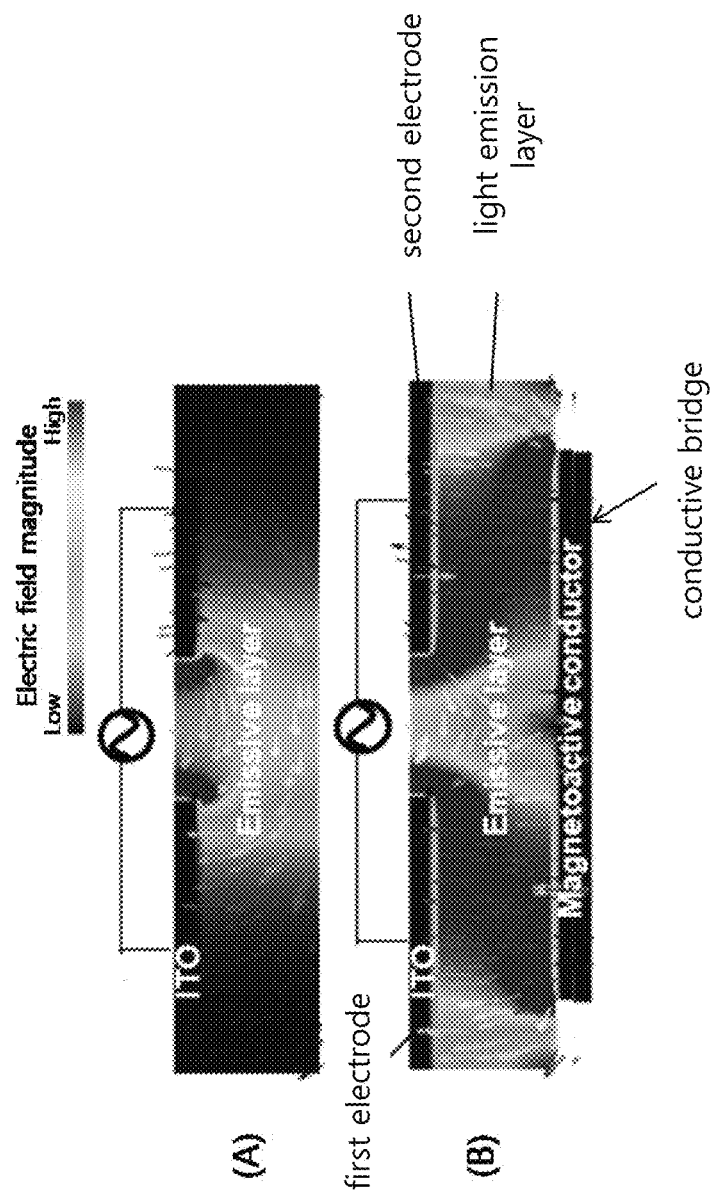
FIG. 6 is a simulation result for showing how the electric field applied to the light emission layer changes according to the formation of the conductive bridge in the light emission device according to the embodiment of the present invention.

FIG. 6 is a simulation result for showing how the electric field applied to the light emission layer changes according to the formation of the conductive bridge in the light emission device according to the embodiment of the present invention. FIG. 6A is a case that there is no conductive bridge, and FIG. 6B is a case that the conductive bridge is formed.

Referring to FIG. 6A, when there is no conductive bridge, an electric field may be limitedly applied in a horizontal direction only to the light emission layer region between the first electrode and the second electrode. The degree to which the electric field is applied may vary according to a distance between the first electrode and the second electrode. As the distance between the first electrode and the second electrode increases, the intensity of the electric field applied to the light emission layer region between the first electrode and the second electrode may further decrease. In this case, the light emission layer hardly emits light or may generate very weak light with limitation.

Referring to FIG. 6B, when a conductive bridge is formed by an external magnetic field, a vertical electric field may be relatively strongly applied to a light emission layer region between the conductive bridge and the first and the second electrodes. A relatively strong vertical magnetic field may be applied in a relatively large area. Accordingly, the light emission layer may emit light with a relatively large intensity in a region where the first and the second electrodes and the conductive bridge overlap each other and in a peripheral region.

The light emission device according to the embodiment of the present application may sense a magnetic field by using an impedance change, and visualize the magnetic field by using a change of light, i.e., EL light generated in the light emission layer. In addition, since the light emission device according to the embodiment may maintain the recorded magnetic field information even when the external magnetic field is removed, it is possible to memorize the magnetic field information. In connection with these functions, the light emission device according to the embodiment may be referred to as a so-called "non-volatile magneto-interactive electroluminescent display (NV-MED) device". Alternatively, a basic structure for constructing the NV-MED device may be provided with the light emission device according to the embodiment.

The light emission device according to this embodiment may sense, visualize, and memorize a magnetic field integrally as a single device. Therefore, the magnetic-interaction display using the light emission device may be easily fabricated in a small size without a complicated and bulky connection structure configured by a conventional microprocessor. As a result, according to the embodiment of the present application, the magnetic-interaction display may be easily fabricated, preferably as a wearable device.

Figure 7:
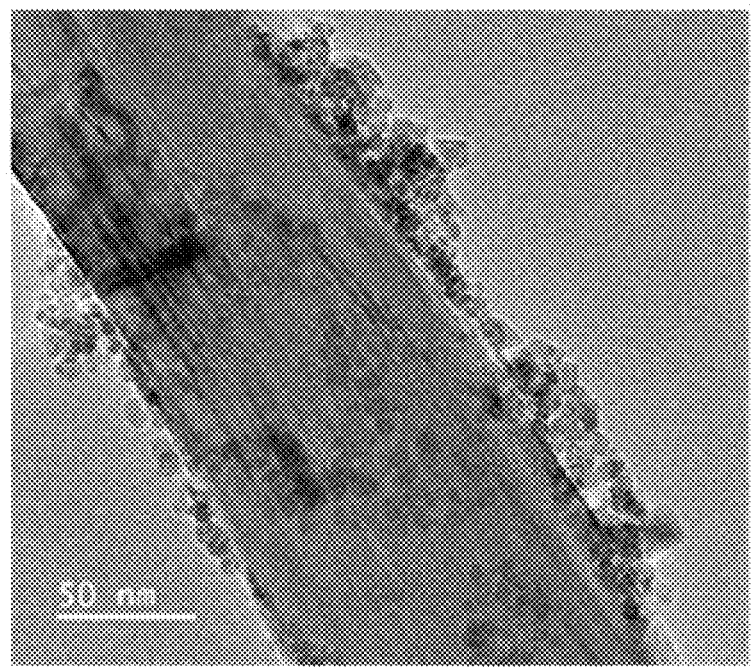
FIG. 7 is a transmission electron microscopy (TEM) image showing a nanostructure that may be utilized into a light emission device according to an embodiment of the present invention.

FIG. 7 is a transmission electron microscopy (TEM) image showing a nanostructure that may be utilized into a light emission device according to an embodiment of the present invention.

Referring to FIG. 7, the nanostructure may be a $Fe_3O_4$-MWNT composite. Here, the $Fe_3O_4$ particle may have a diameter of about 10 to 20 nm, and may be coated (attached) relatively randomly on the surface of the MWNT. The material structure of the nanostructures is exemplary and may be varied.

Figure 8:
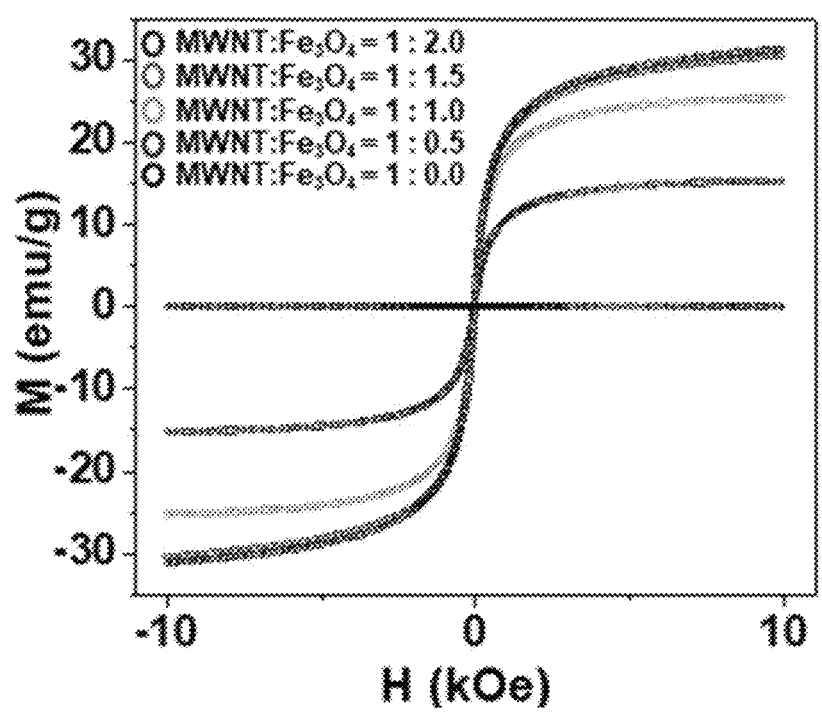
FIG. 8 is a graph showing a hysteresis loop of a nanostructure that may be applied to a light emission device according to an embodiment of the present invention.

FIG. 8 is a graph showing a hysteresis loop of a nanostructure that may be applied to a light emission device according to an embodiment of the present invention. The nanostructure is a $Fe_3O_4$-MWNT composite, and a magnetic hysteresis was measured while changing the mixing ratio of MWNT and $Fe_3O_4$. In FIG. 8, B on the horizontal axis represents the strength of the applied magnetic field, and M on the vertical axis represents the degree of magnetization.

Referring to FIG. 8, the magnetic hysteresis curve is seen according to the mixing ratio of the $Fe_3O_4$-MWNT composite that may be used as a nanostructure. Since $Fe_3O_4$ has superparamagnetic properties, the $Fe_3O_4$-MWNT composite may exhibit superparamagnetic or superparamagnetic properties. When the mixing ratio of MWNT and $Fe_3O_4$ was 1:1.5, the saturation magnetization was observed as approximately 30 emu/g.

Figure 9:
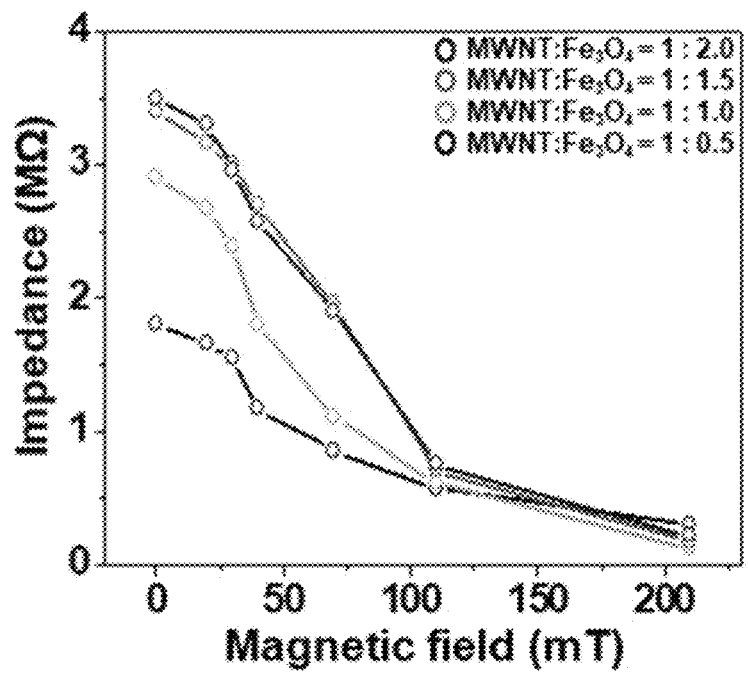
FIG. 9 is a graph showing the results evaluating changes in impedance according to application of a magnetic field of a plurality of nanostructures that may be applied to a light emission device according to an embodiment of the present invention.

FIG. 9 is a graph showing the results evaluating changes in impedance according to application of a magnetic field of a plurality of nanostructures that may be applied to a light emission device according to an embodiment of the present invention. FIG. 9 shows a result of measurement for the device structure in which the two electrodes 200A and 200B are in direct contact with the magnetoactive fluid layer 400 without the light emission layer 300 in FIG. 1. The $Fe_3O_4$-MWNT composite was used as the nanostructure 420 applied in the magnetoactive fluid layer 400, and a plurality of device samples were made while changing the ratio of MWNT and $Fe_3O_4$, and the impedance change of each device sample was measured while changing the magnetic field for each device sample.

Referring to FIG. 9, it may be seen that in a plurality of device samples having different ratios of MWNT and $Fe_3O_4$, a tendency of the impedance change according to the magnetic field change similarly appears. However, when the ratio of MWNT and $Fe_3O_4$ was 1:2.0 or 1:1.5, a more rapid change in impedance was observed. When considering both of sensitivity to a magnetic field and electrical switching characteristics, a nanostructure having a ratio of 1:1.5 may be applied to a device. However, the proper mixing ratio of MWNT and $Fe_3O_4$ may be varied. For example, the proper mixing ratio of MWNT and $Fe_3O_4$ is 1:0.7 through 1:2.5.

On the other hand, as a result of evaluating the characteristics of the device while changing the content of the plurality of nanostructures 420 included in the magnetoactive fluid layer 400, when the content of the plurality of nanostructures 420 is about 1.8 wt %, it was confirmed that excellent light emission (i.e., EL light emission) characteristics may be realized without impairing fluid stability. In this regard, the content of the nanostructure 420 in the magnetoactive fluid layer 400 may be determined to be about 1 wt % to 5 wt %, or about 1.5 wt % to 3 wt %. However, the appropriate content of the nanostructure 420 may be varied in various ways depending on various conditions constituting the device.

Figure 10:
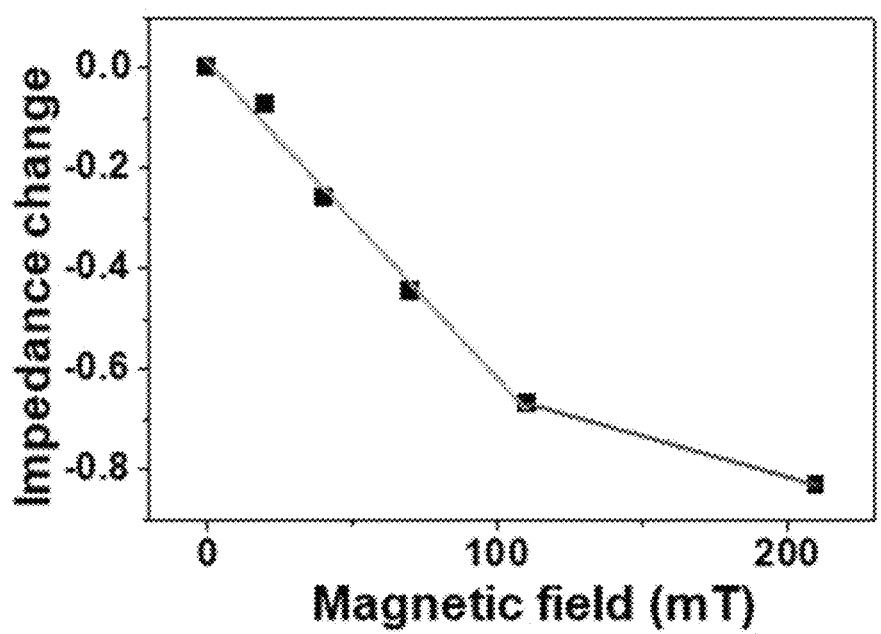
FIG. 10 is a graph showing a change in impedance according to an applied magnetic field strength of a light emission device according to an embodiment of the present invention.

FIG. 10 is a graph showing a change in impedance according to an applied magnetic field strength of a light emission device according to an embodiment of the present invention. The results of FIG. 10 are for a light emission device having the structure of FIG. 1.

Referring to FIG. 10, a change in impedance of the light emission device according to the intensity of the applied magnetic field may be confirmed. The impedance sensitivity SZ of the light emission device may be expressed as SZ=δ(Z/Z0)/δm. Here, m denotes the strength of the applied magnetic field, and Z and $Z_0$ denote impedance before and after application of the magnetic field, respectively. The maximum impedance sensitivity (sensitivity measured as a percentage value) was measured to about 0.644% $mT^{-1}$ in the magnetic field region below about 110 mT, and the impedance sensitivity in the magnetic field region between about 110 mT and about 210 mT was measured to a about 0.166% $mT^{-1}$.

Figure 11:
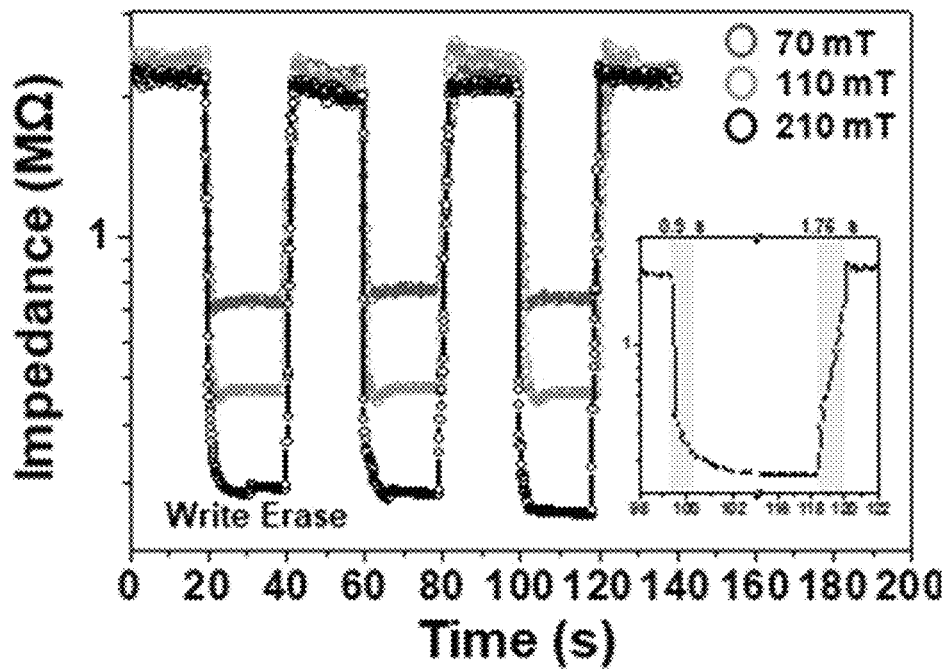
FIG. 11 is a graph showing a change in impedance when a write operation and an erase operation are repeated using by a magnetic field for a light emission device according to an embodiment of the present invention.

FIG. 11 is a graph showing a change in impedance when a write operation and an erase operation are repeated using by a magnetic field for a light emission device according to an embodiment of the present invention. Experiments were conducted according to magnetic fields of various intensities, and a response speed to a write operation and an erase operation was evaluated. In particular, the internal graph of FIG. 11(inset) shows the response speed of the impedance change in a write operation and an erase operation in an enlarged scale.

Referring to FIG. 11, it may be seen that the light emission device according to the embodiment exhibits fast impedance response and relaxation time (below about 300 ms) according to the application of a magnetic field. In addition, it may be seen that as the strength of the applied magnetic field increases more, the variation range of the impedance will increase, and even if the write operation and the erase operation are repeated, the variation range of impedance is maintained almost identically.

Figure 12:
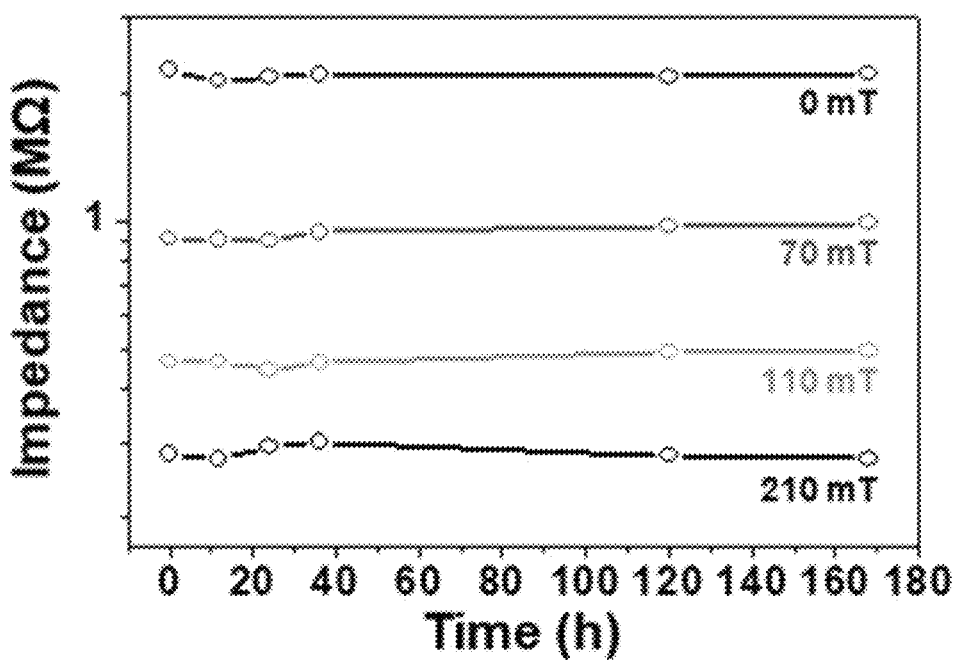
FIG. 12 is a graph showing a result evaluating impedance retention characteristics according to applied magnetic field strength of a light emission device according to an embodiment of the present invention.

FIG. 12 is a graph showing a result evaluating impedance retention characteristics according to applied magnetic field strength of a light emission device according to an embodiment of the present invention. After applying magnetic fields of various intensities, it was confirmed how the stored impedance for each case is maintained over time.

Referring to FIG. 12, since impedance values of various levels appear according to the strength of the applied magnetic field, it may be seen that multi-level programming is possible. In addition, it may be seen that the impedance which has been stored once maintains the corresponding level consistently for about 170 hours or more. It is expected that this is because the conductive bridge percolation network which has been once formed maintains electrical properties well for a long period of time due to physical fixation and dielectrophoretic effects.

Figure 13:
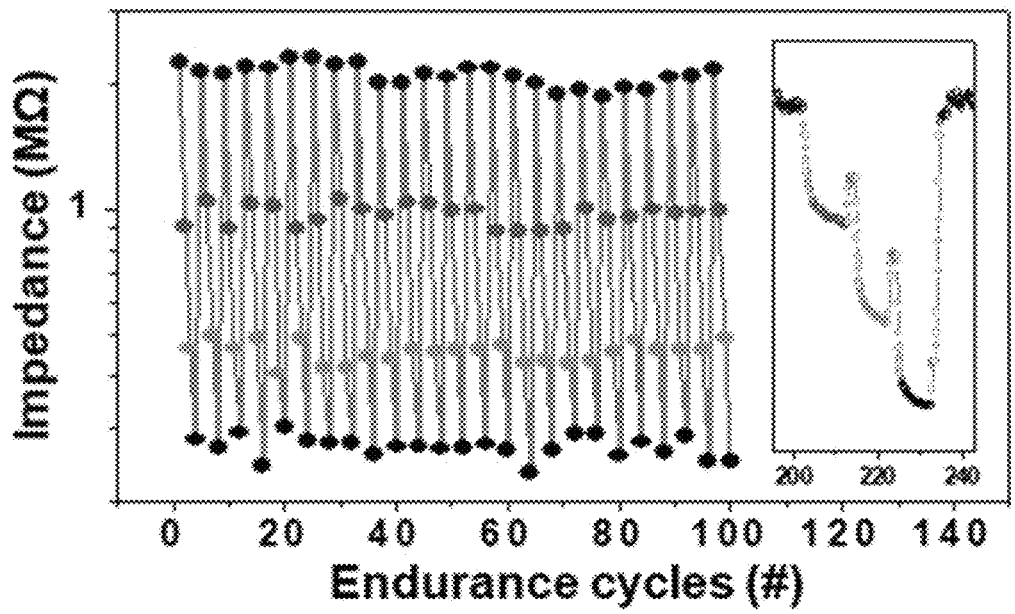
FIG. 13 is a graph showing the results evaluating impedance change characteristics while repeating a write-erase cycle by using a magnetic field for a light emission device according to an embodiment of the present invention.

FIG. 13 is a graph showing the results evaluating impedance change characteristics while repeating a write-erase cycle by using a magnetic field for a light emission device according to an embodiment of the present invention. At this time, for recording and erasing operations, a magnetic field of 210 mT intensity and an alternating current AC frequency of 10 kHz were used. The inset in the graph of FIG. 13 shows the actual impedance change in one cycle. In one cycle, a recording magnetic field of 70 mT, a recording magnetic field of 110 mT, and a recording magnetic field of 210 mT were sequentially applied, and then an erase magnetic field of −210 mT was applied Referring to FIG. 13, it may be seen that even after 100 cycles, the multi-level impedance change is excellently maintained like in the initial cycle. Therefore, the light emission device according to the embodiment may have excellent write-erase cycle endurance.

Figure 14:
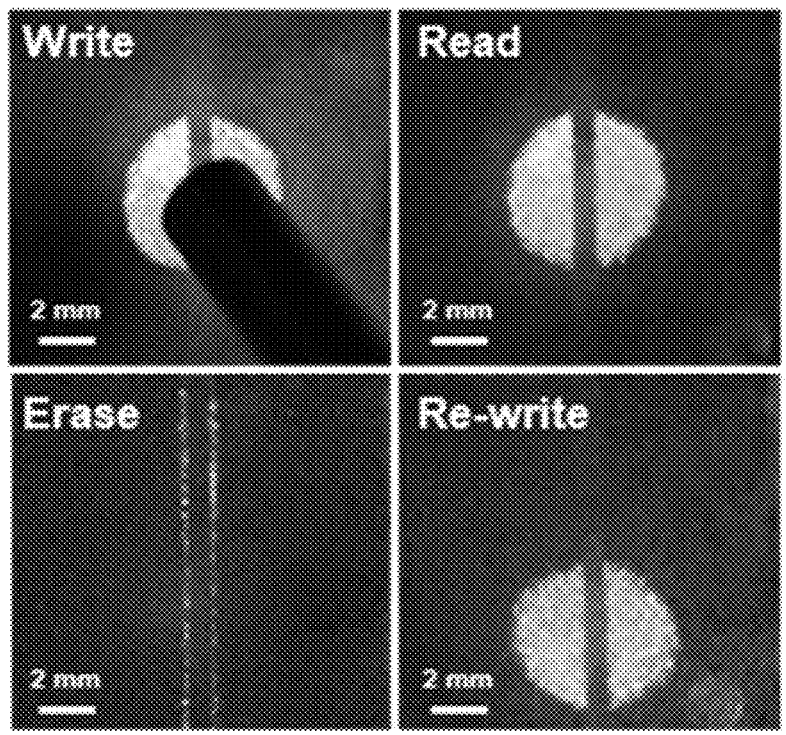
FIG. 14 is a photographic image showing how light emission characteristics are changed in writing, reading, erasing, and rewriting steps of a light emission device according to an embodiment of the present invention.

FIG. 14 is a photographic image showing how light emission characteristics are changed in writing, reading, erasing, and rewriting steps of a light emission device according to an embodiment of the present invention. Each step may correspond to the steps described with reference to FIG. 4.

Referring to FIG. 14, the magnetic field applied to the light emission device may be directly visualized by light, i.e., EL light generated by the light emission device. In a state in which an electrical signal (AC drive signal) is applied between the two electrodes 200A and 200B of FIG. 4, light may be generated in a region to which a magnetic field is applied.

Figure 15:
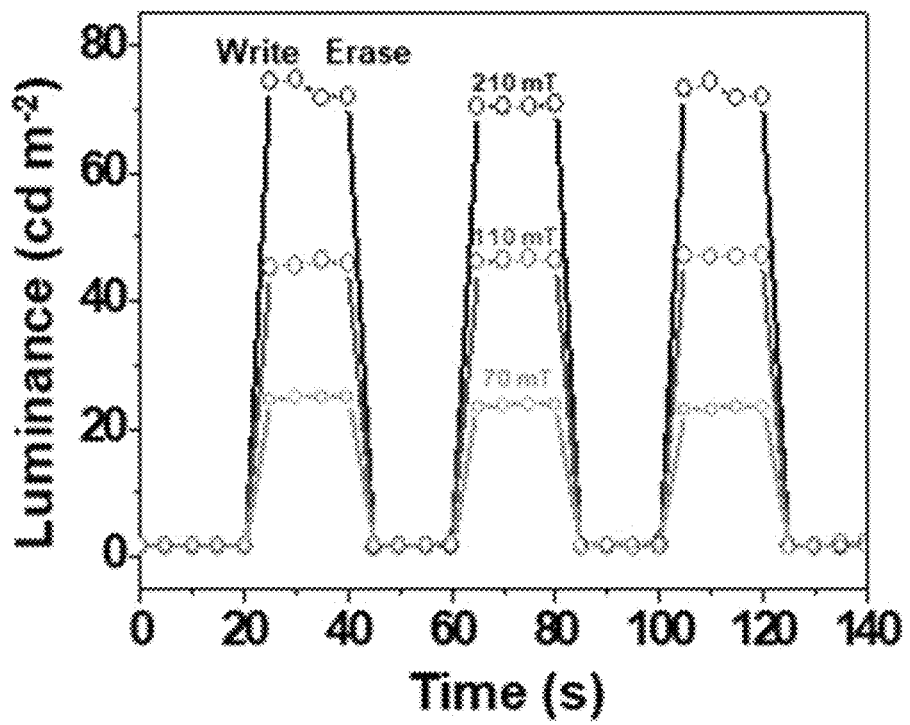
FIG. 15 is a graph showing a result measuring a change in light emission intensity while repeating a write operations and an erase operation for a light emission device according to an embodiment of the present invention.

FIG. 15 is a graph showing a result measuring a change in light emission intensity while repeating a write operations and an erase operation for a light emission device according to an embodiment of the present invention. A recording operation and an erasing operation were performed by using different magnetic fields having different intensities, respectively.

Referring to FIG. 15, it may be seen that as the intensity of the recording magnetic field increases, the light emission intensity, i.e., EL intensity of the light emitting device increases. According to the intensity of the magnetic field, the luminescence intensity appeared at various levels, and the tendency in change the luminescence intensity was maintained even if the recording and erasing operations were repeated.

Figure 16:
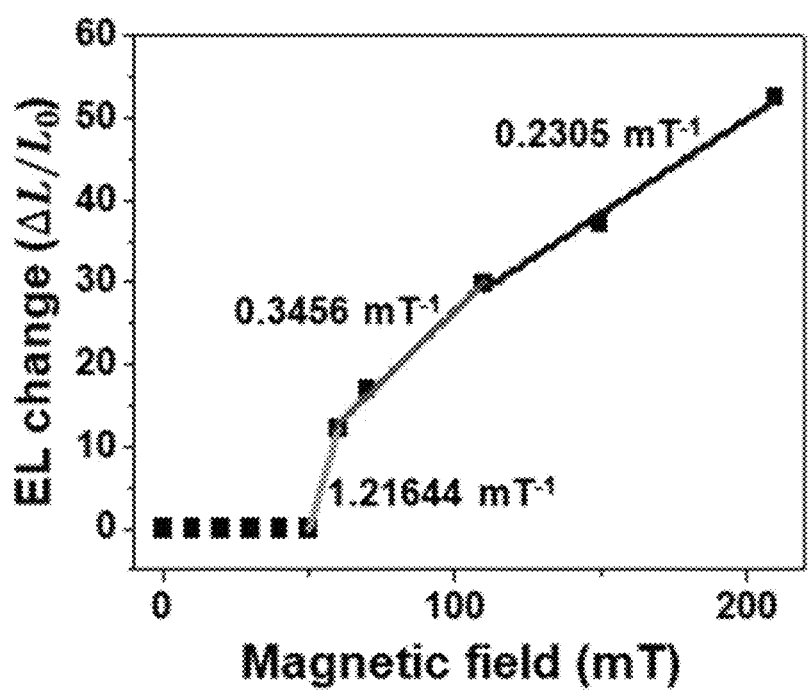
FIG. 16 is a graph showing a change in light emission intensity, i.e., EL intensity according to an applied magnetic field intensity of a light emission device according to an embodiment of the present invention.

FIG. 16 is a graph showing a change in light emission intensity, i.e., EL intensity according to an applied magnetic field intensity of a light emission device according to an embodiment of the present invention. The results of FIG. 16 are for a light emission device having the structure of FIG. 1.

Referring to FIG. 16, a change in the EL intensity of the light emission device according to the intensity of the applied magnetic field may be observed. The EL sensitivity $S_{EL}$ of the light emission device may be expressed as $S_{EL}=\delta(L/L0)/\delta m$. Here, m denotes the intensity of the applied magnetic field, and L and $L_0$ denote EL intensity before and after application of the magnetic field, respectively. The EL sensitivity of the light emitting element according to the intensity of the magnetic field is described corresponding to each region of the graph.

Figure 17:
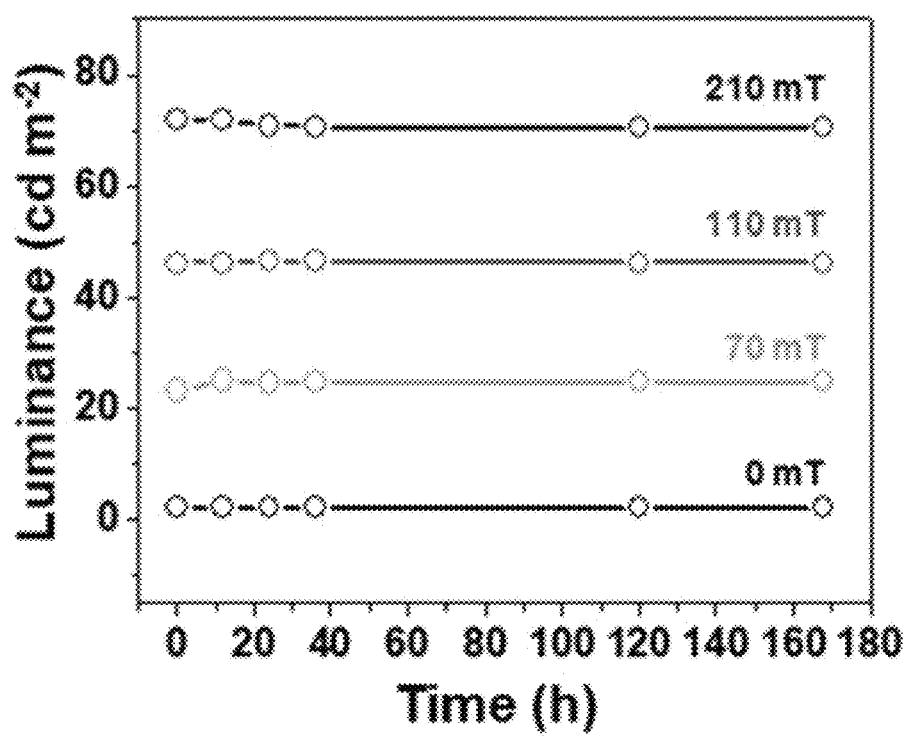
FIG. 17 is a graph showing a result evaluating retention characteristics of luminescence intensity, i.e., EL intensity according to an applied magnetic field intensity of a light emission device according to an embodiment of the present invention.

FIG. 17 is a graph showing a result evaluating retention characteristics of luminescence intensity, i.e., EL intensity according to an applied magnetic field intensity of a light emission device according to an embodiment of the present invention. After applying a magnetic field of various intensities, it was observed how the stored luminescence intensity, i.e., EL intensity for each case was maintained over time.

Referring to FIG. 17, EL intensities of various levels is observed according to the strength of the applied magnetic field. In addition, it may be seen that the EL intensity which is stored once maintains the level well for about 170 hours or more.

Figure 18:
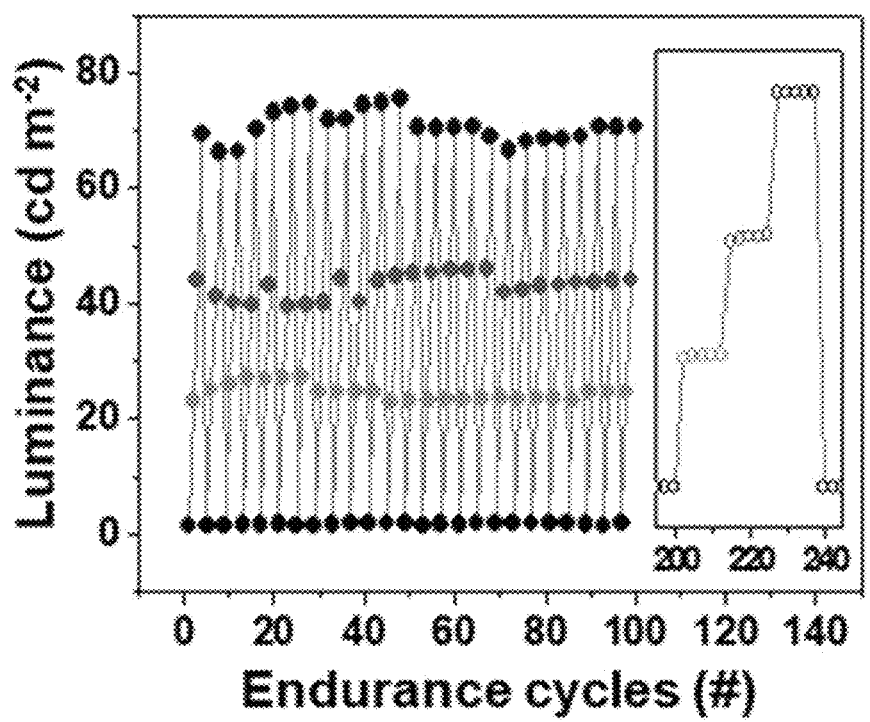
FIG. 18 is a graph showing a result evaluating a change characteristic of light emission intensity, i.e., EL intensity while repeating a write-erase cycle using a magnetic field for a light emission device according to an embodiment of the present invention.

FIG. 18 is a graph showing a result evaluating a change characteristic of light emission intensity, i.e., EL intensity while repeating a write-erase cycle using a magnetic field for a light emission device according to an embodiment of the present invention. The inset in the graph of FIG. 18 shows the actual EL intensity change in one cycle.

Referring to FIG. 18, it may be seen that even after 100 cycles, the multi-level EL change is maintained as well as in the initial cycle. In this view, the light emission device according to the embodiment has excellent write-erase cycle endurance for light emission characteristics.

Figure 19:
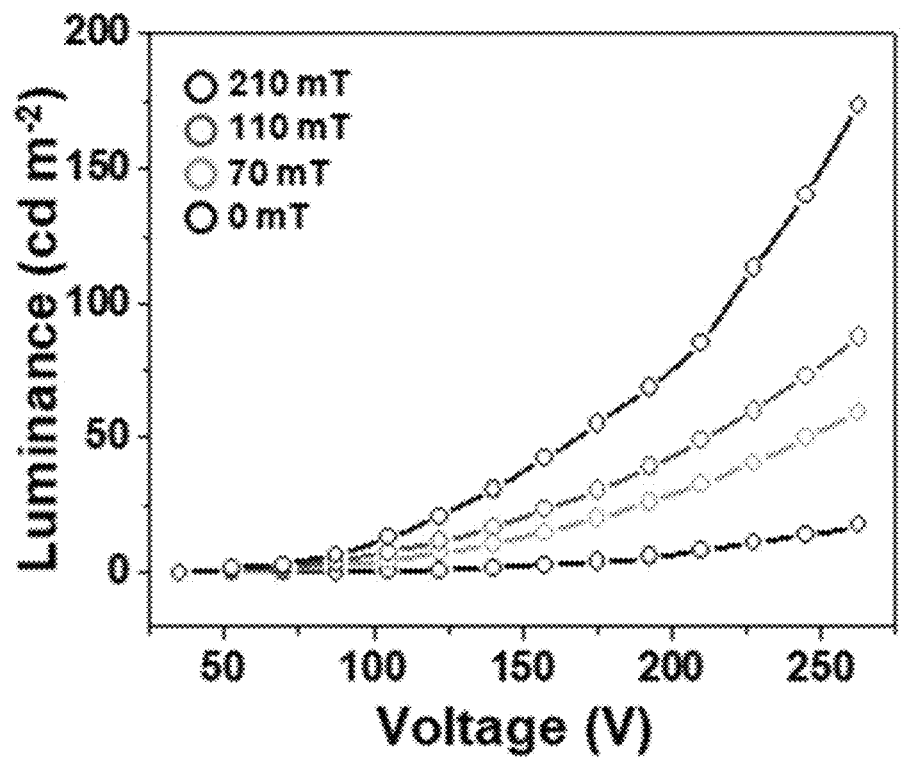
FIG. 19 is a graph showing a result evaluating a change in light emission characteristics according to a change in applied voltage while applying a magnetic field of various intensities to a light emission device according to an embodiment of the present invention.

FIG. 19 is a graph showing a result evaluating a change in light emission characteristics according to a change in applied voltage while applying a magnetic field of various intensities to a light emission device according to an embodiment of the present invention. That is, in a state in which each of magnetic fields of various intensities is applied, a change in luminance according to a change in voltage is measured for each case. Here, the voltage represents the voltage applied between the two electrodes.

Referring to FIG. 19, it may be seen that as the magnetic field strength increase more, a very excellent high luminance characteristics is exhibited at the same voltage level, and there is a tendency that an increase width of luminance is becoming somewhat larger as the voltage is increasing. Even when the magnetic field is 0, and when the applied voltage is strong, light of a weak intensity may be generated. However, when the distance between the two electrodes is increased, even if the applied voltage increases, light emission characteristics may do not appear.

Figure 20:
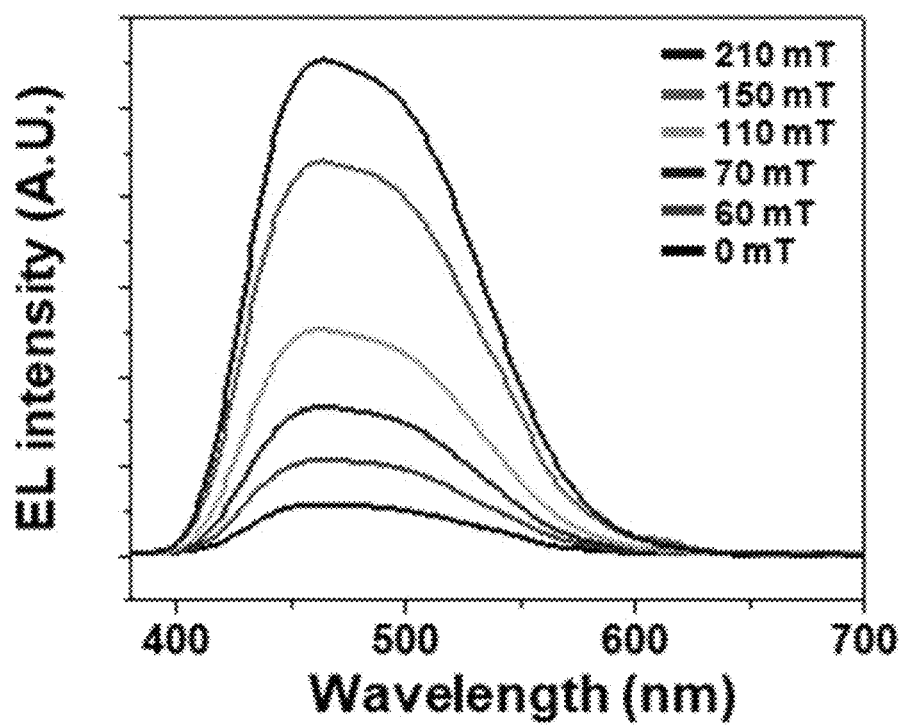
FIG. 20 is a graph showing a light emission spectrum of a light emission device according to an embodiment of the present invention.

FIG. 20 is a graph showing a light emission spectrum of a light emission device according to an embodiment of the present invention. After applying magnetic fields of various intensities, the light-emitting spectra were measured for each case. This result corresponds to the case where the light emission device includes a blue (B)-emitting layer.

Referring to FIG. 20, it may be observed that as the intensity of the applied magnetic field increases, the light-emitting intensity increases.

Figure 21:
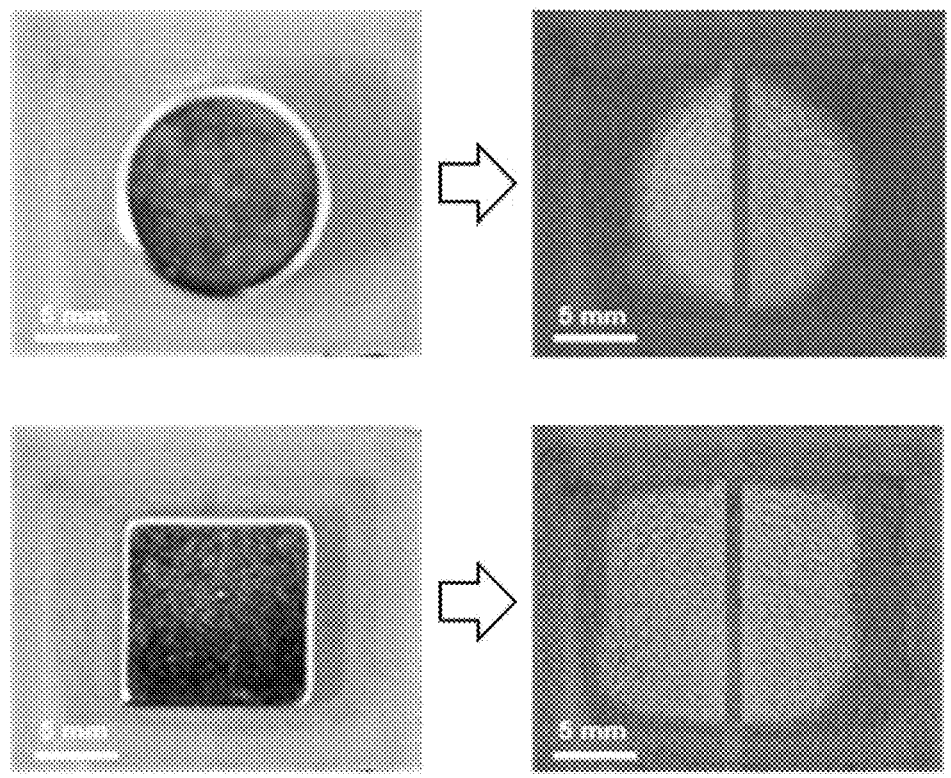
FIG. 21 is a photographic image showing a result observing a change of a light-emitting type while changing form or shape of a magnetic material for applying a magnetic field to the light emission device according to an embodiment of the present invention.

FIG. 21 is a photographic image showing a result observing a change of a light-emitting type while changing form or shape of a magnetic material for applying a magnetic field to the light emission device according to an embodiment of the present invention.

Referring to FIG. 21, when the form of the magnetic field applied according to the form of the magnetic body is changed, it may be seen that the form of the light-emitting region changes according to the form of the magnetic field. That is, it may be seen that the characteristics of light-emitting only appear in the region where the magnetic field is applied by directly reflecting the form of the magnetic field. Therefore, direct visualization according to the form of the magnetic field may be possible.

Figure 22:
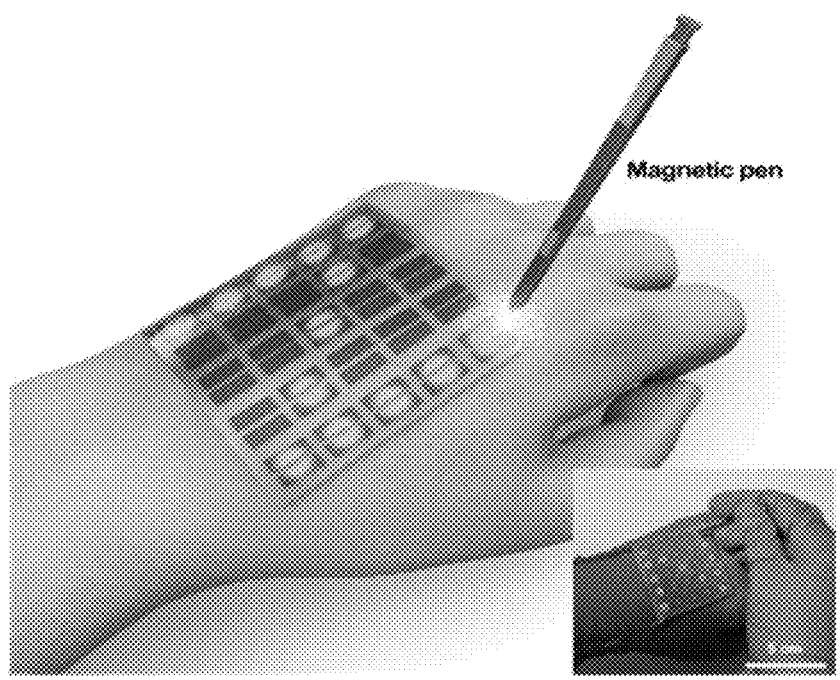
FIG. 22 is a photographic image showing a case where an array element having a plurality of pixels is implemented by using a light emitting element according to an embodiment of the present invention as a basic structure.

FIG. 22 is a photographic image showing a case where an array element having a plurality of pixels is implemented by using a light emitting element according to an embodiment of the present invention as a basic structure. The array device may be a flexible device, a wearable device, or a device applicable to skin i.e., a skin-mountable device.

Referring to FIG. 22, a non-volatile magneto-interactive electroluminescent display (NV-MED) array device having a plurality of pixel regions may be fabricated. The array device of this embodiment has 5×5 pixel areas, and each pixel area may have a configuration similar to FIG. 1. A plurality of parallel-type electrodes may be disposed. Each pixel area may have a size of about 0.8×0.8 cm$^2$, and a spacing between pixels may be about 0.2 cm. However, the configuration and dimensions of these array devices are exemplary and may be variously changed.

A magnetic field may be applied to the array device as a predetermined shape by using a magnetic pen, and the array device may exhibit light-emitting characteristics according to the shape of the applied magnetic field. The applied magnetic field may be directly displayed or visualized. Further, even if the applied magnetic field is removed, the information stored by the magnetic field may be generally maintained as it is. When the size of a pixel is reduced and a large number of pixels are placed in a small area, sensing resolution and visualization resolution may be greatly increased.

Figure 23:
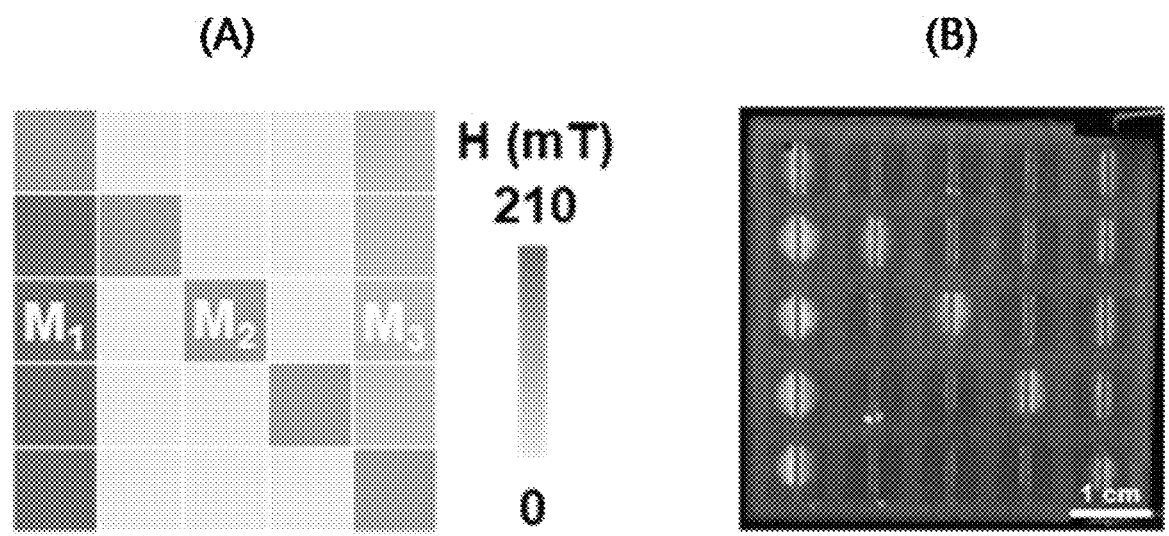
FIG. 23A and FIG. 23B are a view showing a case changing the magnetic field strength when inputting magnetic field information to an array type light emission device according to an embodiment of the present invention.

FIGS. 23A and 23B are a view showing a case changing the magnetic field strength when inputting magnetic field information to an array type light emission device according to an embodiment of the present invention.

Referring to FIG. 23A, information may be input to a first portion by a first magnetic field $M_1$ having a first strength, information may be input to a second portion by a second magnetic field $M_2$ having a second strength, and information may be input to the third portion by the third magnetic field $M_3$ having the third intensity.

Referring to FIG. 23B, different luminescence intensities may be observed for each corresponding portion according to the intensity of the input magnetic field. Therefore, the information to be visualized may vary according to the intensity change of the input magnetic field. In other words, multi-level visualization and memorizing may be available. Here, the case where a magnetic field of a simple form is visualized in three levels is illustrated, but the level of the magnetic field information to be visualized may be more diversified, and the form of the visualized magnetic field may also be more complicated.

Figure 24:
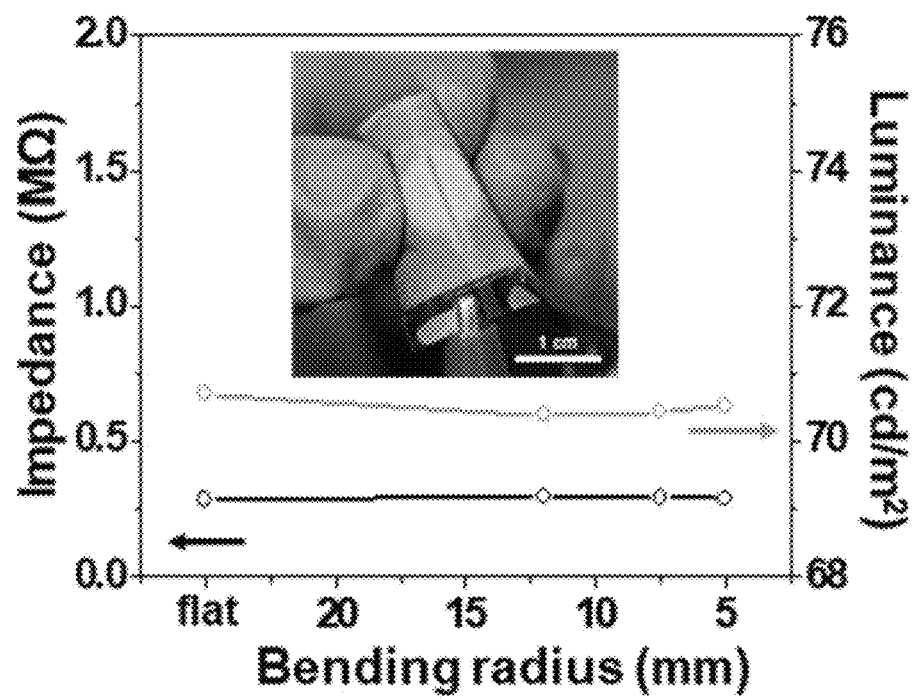
FIG. 24 is a graph showing a result measuring a change in impedance and a change in luminance, i.e., EL intensity according to a bending radius of a light emission device when the light emission device according to an embodiment of the present invention is flexible.

FIG. 24 is a graph showing a result measuring a change in impedance and a change in luminance, i.e., EL intensity according to a bending radius of a light emission device when the light emission device according to an embodiment of the present invention is flexible.

Referring to FIG. 24, even if the degree of bending of the light emission device is greatly increased, impedance and luminance of the light emission device may hardly change. Therefore, even if the light emitting element is bent to a certain extent, the degree of bending may not significantly affect the magnetic field sensing, visualization, and memorizing performances of the light emission device.

Figure 25:
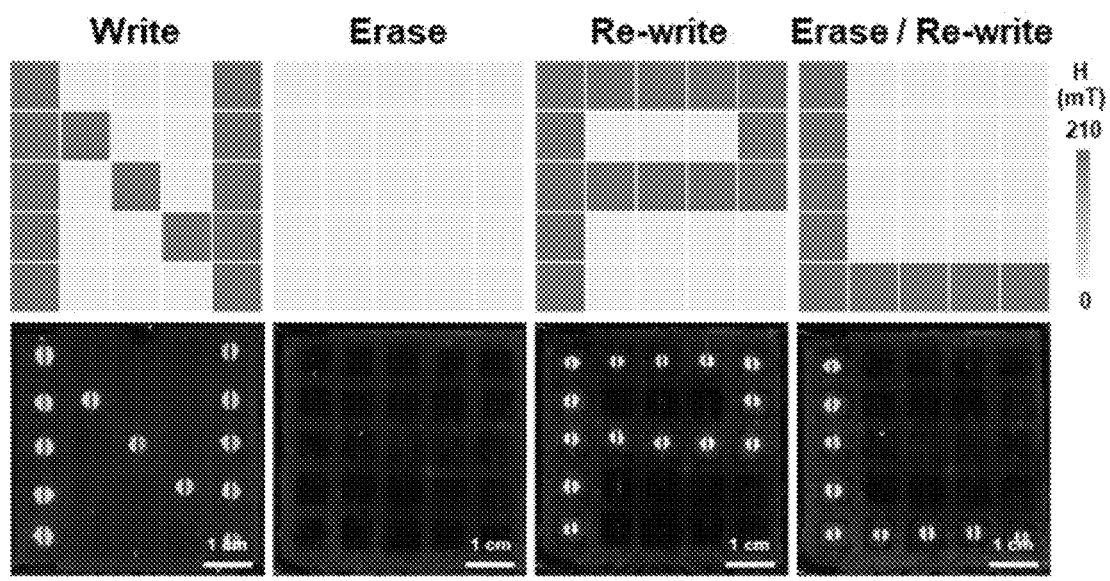
FIG. 25 is a diagram showing the distribution (top view) of the programmed magnetic field in the recording, erasing, and rewriting steps and the light emission performance (bottom view) in each step of an array type light emission device according to an embodiment of the present invention.

FIG. 25 is a diagram showing the distribution (top view) of the programmed magnetic field in the recording, erasing, and rewriting steps and the light emission performance (bottom view) in each step of an array type light emission device according to an embodiment of the present invention.

Referring to FIG. 25, an array type light emission device according to an embodiment may be a device capable of sensing or detecting, visualizing, and memorizing various magnetic field information, as well as capable of recording, erasing, and rewriting information by using a magnetic field. After the information is recorded and erased, new information may be recorded again.

Figure 26:
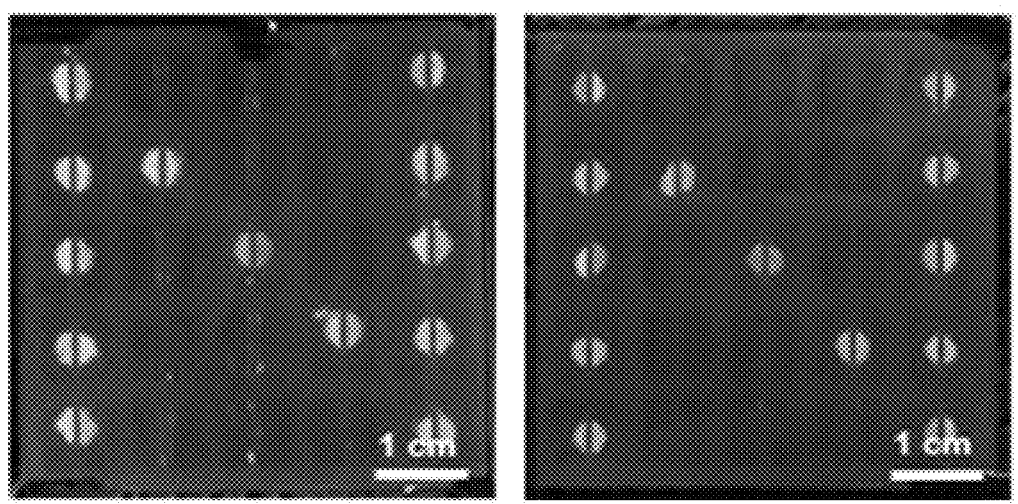
FIG. 26 is a photographic image showing a plurality of array type light emission devices according to an embodiment of the present invention.

FIG. 26 is a photographic image showing a plurality of array type light emission devices according to an embodiment of the present invention.

Referring to FIG. 26, two array type light emission devices may display different light emission colors. The light emission device on the left may be a green light emission device, and the light emission device on the right may be an orange light emission device. The green light emission may be expressed by using a low alternating current AC frequency of 1 kHz from the light emission device according to the embodiment. The orange light emission may be easily implemented from a light emission device to which a light emission layer including ZnS nanoparticles or micro-particles for orange light emission is applied. As described above, when the light emission device according to the embodiment is used, various colors may be expressed.

Figure 27:
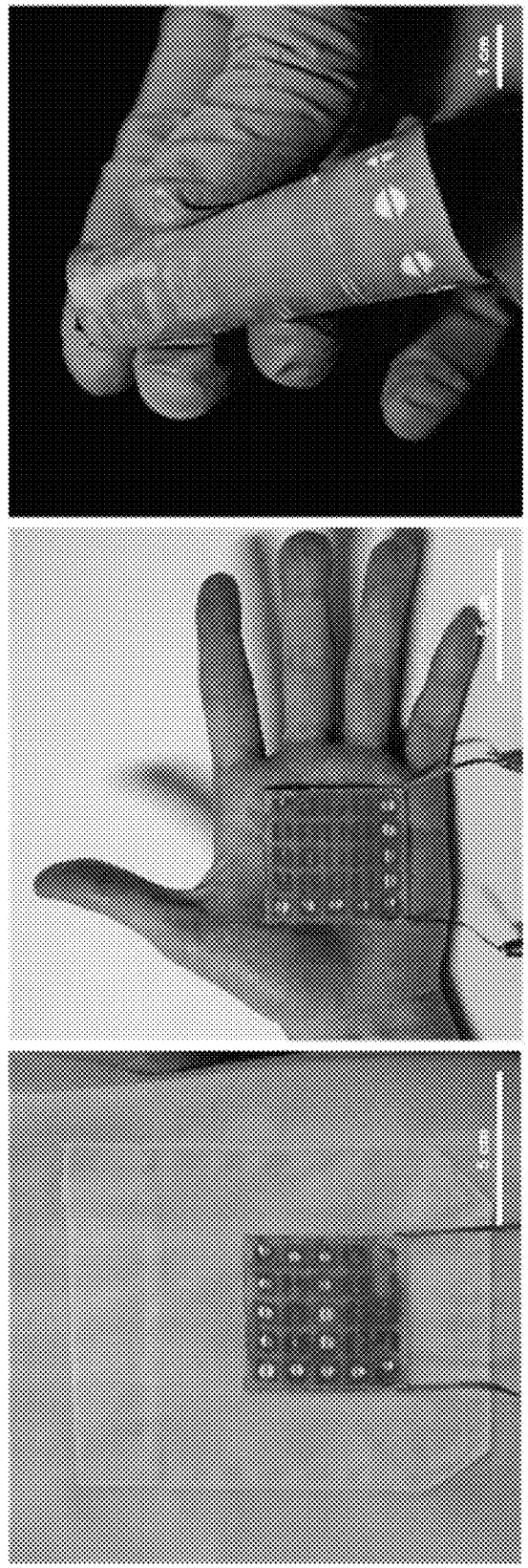
FIG. 27 is a photographic image showing a case in which an array type light emission device according to an embodiment of the present invention is applied in various ways.

FIG. 27 is a photographic image showing a case in which an array type light emission device according to an embodiment of the present invention is applied in various ways.

Referring to FIG. 27, the figure on the left shows the case where the light emission device is applied to clothing, the figure in the center shows the case where the light emission device is applied to the palm of a person, and the figure on the right shows the case where the light emitting element is bent with a finger. When applied to various non-polar surfaces, the light emission device according to the embodiment may effectively sense (detect), visualize, and memorize magnetic field information without deteriorating its characteristics even if it is mechanically bent or stressed.

FIG. 28A to FIG. 28F are perspective diagrams showing a method of fabricating a light emission device according to an embodiment of the present invention.

Figure 28A:
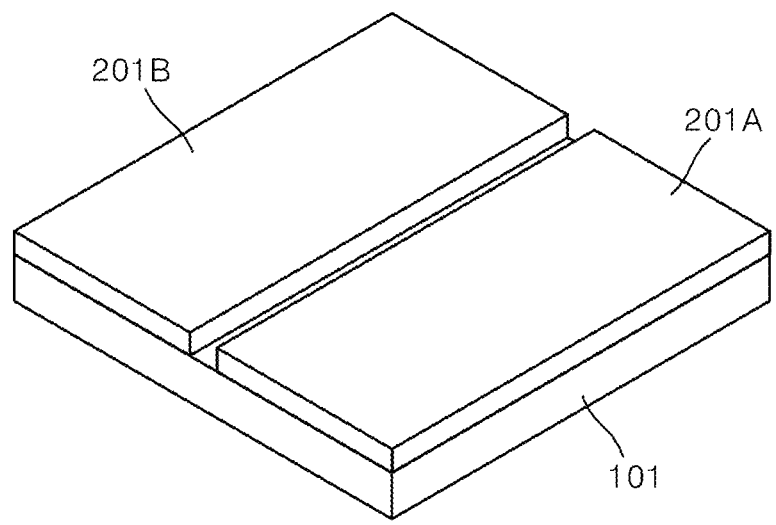
FIG. 28A to FIG. 28F are perspective diagrams showing a method of fabricating a light emission device according to an embodiment of the present invention.

Referring to FIG. 28A, first and second electrodes 201A and 201B spaced apart from each other may be formed on the substrate 101. The substrate 101 may be made of a polymer material such as for example, PET, but the material of the substrate 101 may be variously changed. In some cases, the substrate 101 may be a rigid substrate such as glass. The first and second electrodes 201A and 201B may be transparent electrodes. For example, the first and second electrodes 201A and 201B may be formed of transparent conductive oxide TCO. For example, the first and second electrodes 201A and 201B may be formed of indium tin oxide ITO. However, the materials of the first and second electrodes 201A and 201B may be variously changed. The first and second electrodes 201A and 201B may be formed to be spaced apart from each other by about 1 mm, and their thickness may be about 80 nm, respectively, and sheet resistance may be about 20 $\Omega cm^{-2}$. However, the distance between them, the thickness, the resistance, etc. of the electrodes 201A, 201B may be varied.

Figure 28B:
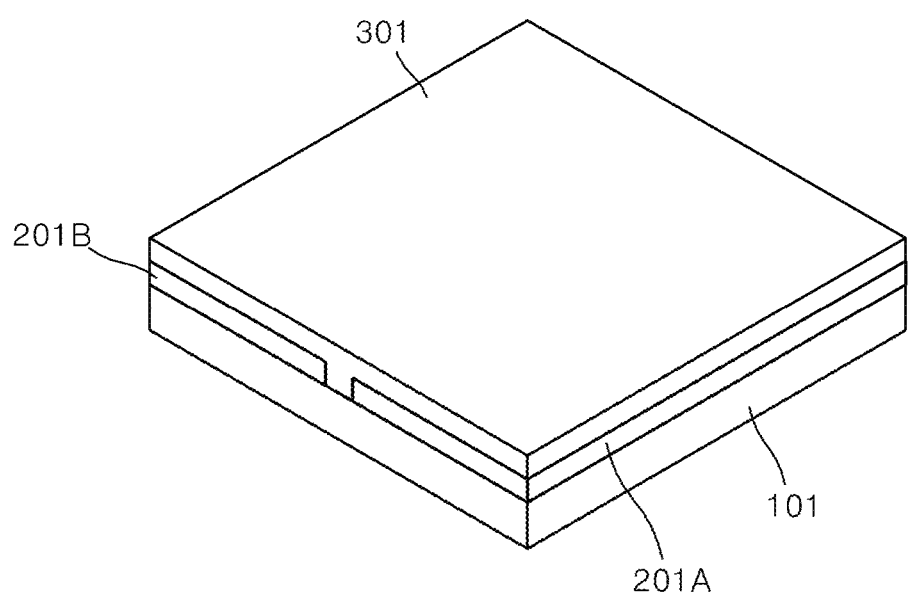

Referring to FIG. 28B, a light emission layer 301 may be formed on the first and second electrodes 201A and 201B. The light emission layer 301 may also be formed on a region of the substrate 101 between the first and second electrodes 201A and 201B. The light emission layer 301 may include a material having electroluminescence properties capable of emitting light by an electric field. The light emission layer 301 may include an organic material layer and a light emitting element, i.e., a light emitting component provided in the organic material layer. As one example, the light emission layer 301 may include a ZnS:Cu material as a light emitting element (a light emitting component) in the PVDF-TrFE-CFE layer (an organic material layer). After mixing ZnS:Cu powder and a curing agent in a solution in which PVDF-TrFE-CFE is dissolved, the mixed solution may be coated on the first and second electrodes 201A and 201B by spin coating and then, the light emission layer 301 may be formed by performing a predetermined annealing process on the coated film. For example, the spin coating may be performed at about 2000 rpm for about 60 seconds, and the annealing may be performed at about 80° C. for 12 hours. However, these process conditions are merely exemplary, and may be variously changed. In addition, the material of the organic material layer and the light emitting component included in the light emission layer 301 may be variously changed. For example, PDMS may be used as an organic material layer instead of PVDF-TrFE-CFE. As a light emitting element (a light emitting component), another material may be used instead of the ZnS:Cu material. For example, a predetermined metal or a metal oxide such as ZnO may be used as the light emission device or the light emission component. The light emission layer 301 may emit light by an alternating current AC signal, and may have flexible characteristics.

Figure 28C:
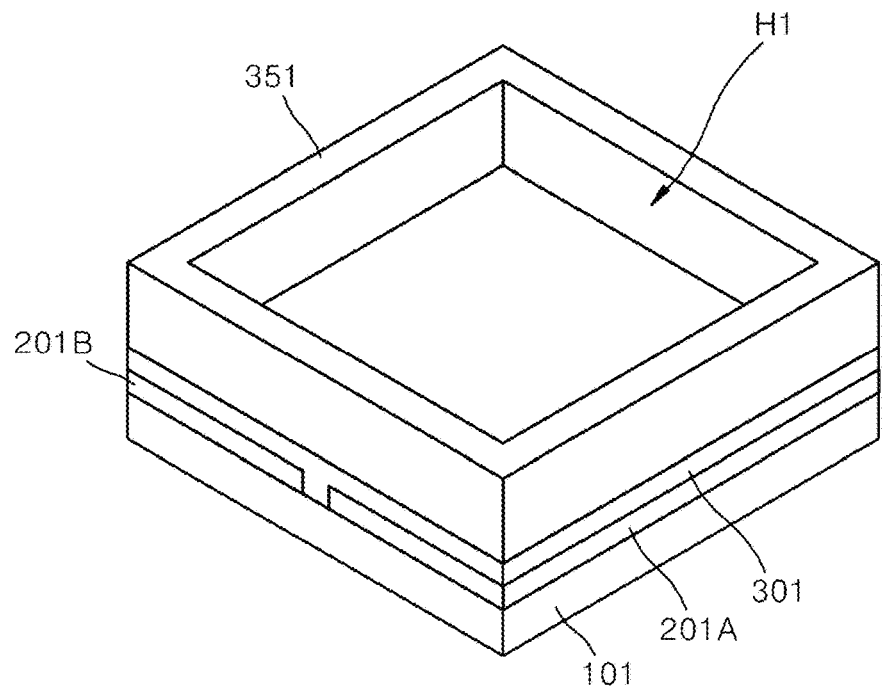

Referring to FIG. 28C, a reception layer, that is, a reception element 351 may be formed on the light emission layer 301 to provide a reception space H1 in which a magnetoactive fluid layer (401 of FIG. 28D) is accommodated. The reception element 351 may include a so-called square segmented structure, and may serve as a kind of spacer that provides a reception space for the magnetoactive fluid layer (401 in FIG. 28D). The reception element 351 may be formed of, for example, an acrylic film having strong adhesion. However, this is exemplary, and the material of the reception element 351 may vary.

Figure 28D:
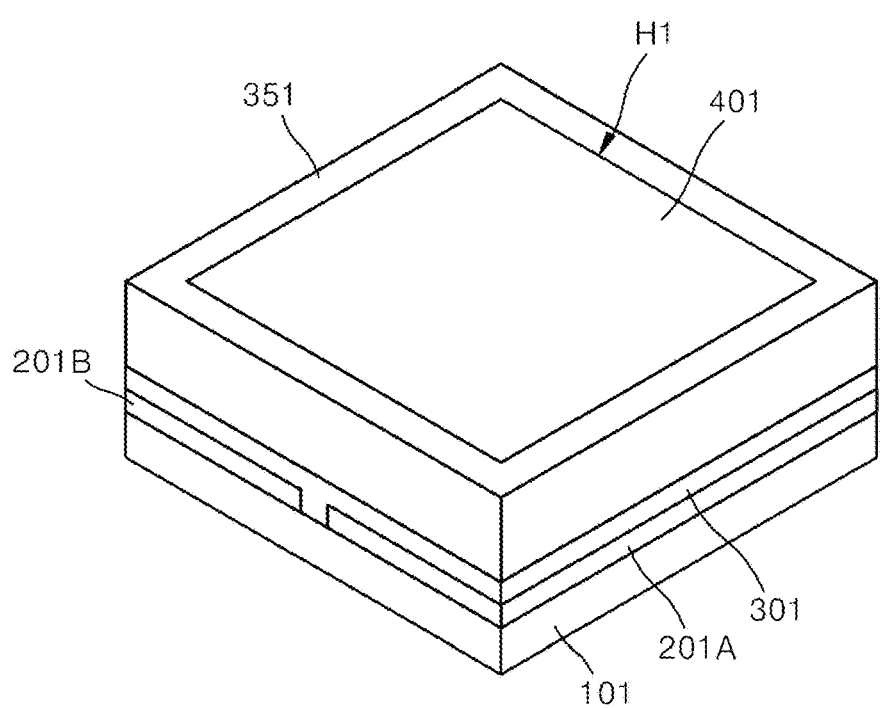

Referring to FIG. 28D, the magnetoactive fluid layer 401 may be formed on the light emission layer 301. The magnetoactive fluid layer 401 may be provided in the reception space H1 of the reception element 351. The magnetoactive fluid layer 401 may include a plurality of nanostructures (not shown) (420 of FIG. 1). The magnetoactive fluid layer 401 may include a predetermined organic solvent and a plurality of nanostructures dispersed in the organic solvent. The arrangement and distribution of the plurality of nanostructures in the magnetoactive fluid layer 401 may be changed by a magnetic field applied from the outside. In the magnetoactive fluid layer 401, light emitting characteristics of the light emission layer 301 may be changed according to the arrangement and distribution of the plurality of nanostructures. The plurality of nanostructures may include the conductive nanowire, and the magnetic nanoparticle provided on the surfaces of the conductive nanowire as described in FIG. 3.

Figure 28E:
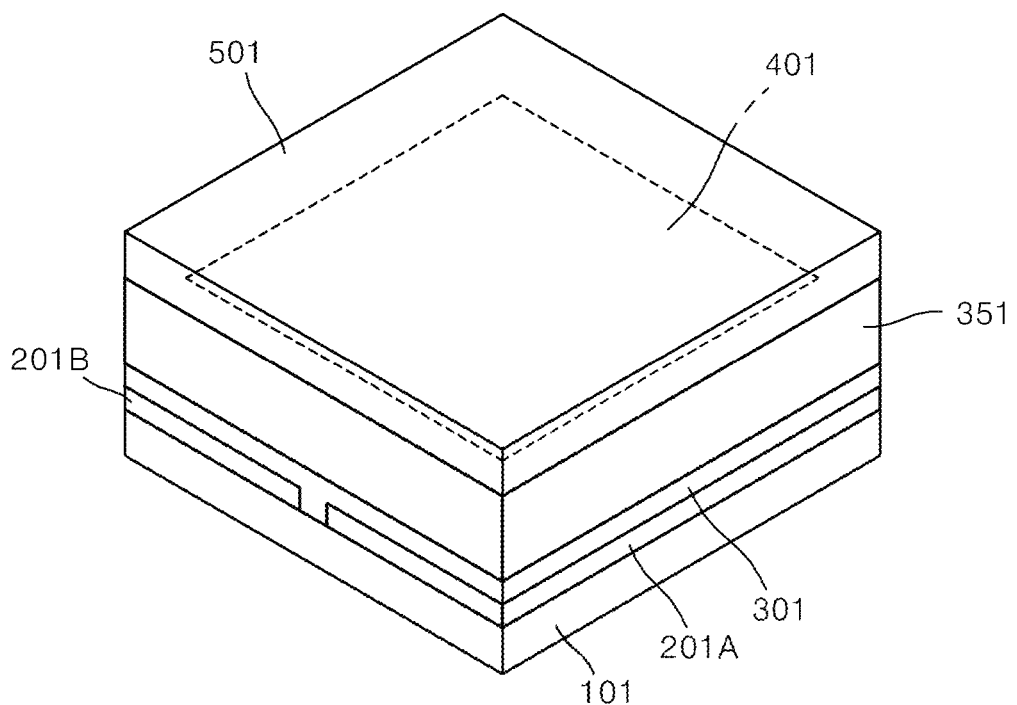

Referring to FIG. 28E, a cover layer 501 for sealing the magnetoactive fluid layer 401 may be further formed. The cover layer 501 may serve to prevent falling off, or evaporation of the magnetoactive fluid layer 401. The cover layer 501 may be provided on the reception element 351 and the magnetoactive fluid layer 401. The cover layer 501 may be formed of a polymer material such as PET, but is not limited thereto, and the applied material may be variously changed. When the substrate 101 is referred to as a first substrate, the cover layer 501 may be referred to as a second substrate.

Figure 28F:
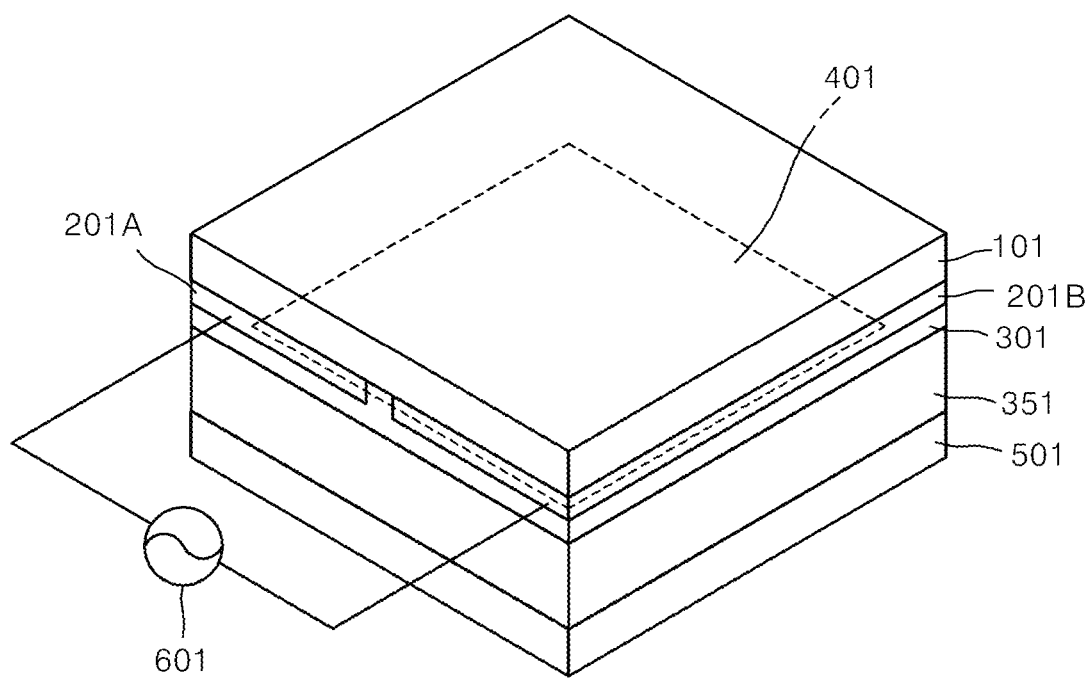

Referring to FIG. 28F, the power supply unit 601 may be connected to the first and second electrodes 201A and 201B. A predetermined electrical signal, for example, an alternating current AC signal, may be applied between the first and second electrodes 201A and 201B through the power supply unit 601. An AC voltage may be applied between the first and second electrodes 201A and 201B through the power supply unit 601, and the light emission device may be driven by an AC electric field generated by the AC voltage.

The light emission device fabricated according to the present embodiment may be a flexible device. Therefore, the light emission device may be easily fabricated as a wearable device. A multi pixels device may be fabricated by implementing a plurality of light emission pixels with one light emission device as a unit pixel.

Figure 29:
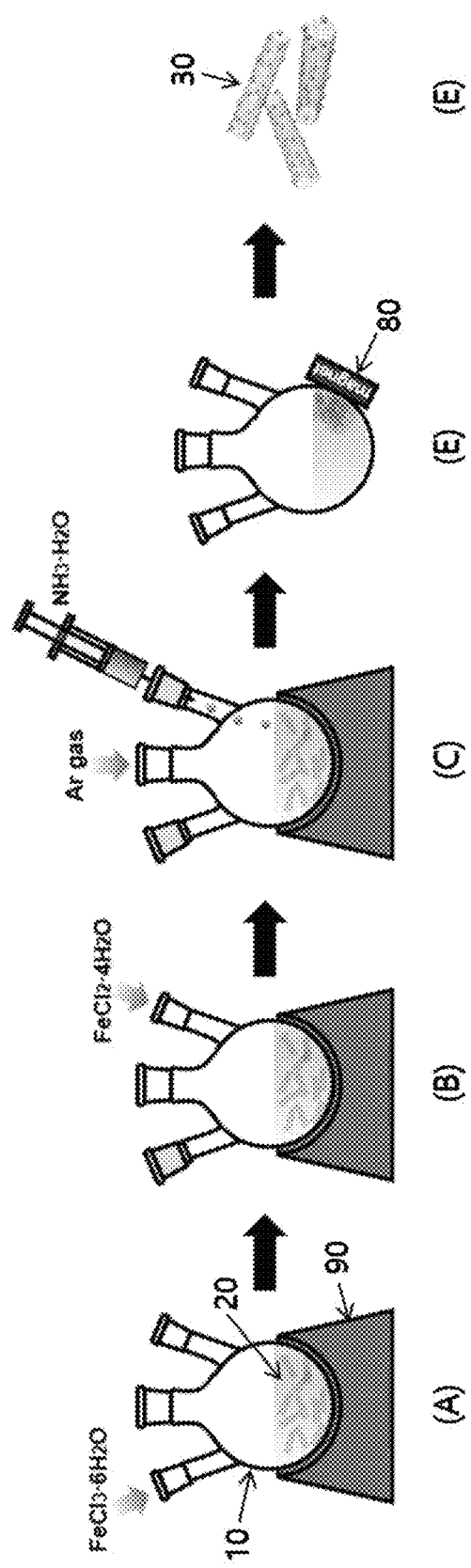
FIG. 29 is a diagram illustrating a method for forming a nanostructure that may be applied to a light emission device according to an embodiment of the present invention.

FIG. 29 is a diagram illustrating a method for forming a nanostructure that may be applied to a light emission device according to an embodiment of the present invention.

Referring to the drawing (A) of FIG. 29, a container 10 having a plurality of inlets may be provided, and a solution 20 in which MWNT is dispersed (hereinafter, referred to as MWNT dispersion) may be provided in the container 10. The container 10 containing the MWNT dispersion 20 may be placed on a predetermined heating mechanism 90 and be heated to a predetermined temperature. For example, it may be heated to a temperature of about 60~80° C., for example, a temperature of about 70° C. by using the heating mechanism 90. Then, $FeCl_3 \cdot 6H_2O$ material may be injected into the container 10.

Referring to FIG. 29 (B), $FeCl_2 \cdot 4H_2O$ material may be injected into the container 10. At this time, the heating temperature of the container 10 may be the same as the step illustrated in FIG. 29 (A).

Referring to FIG. 29 (C), an argon Ar gas atmosphere is formed in the container 10, and $NH_3 \cdot H_2O$ material may be injected into the container 10 in this Ar atmosphere. At this time, the heating temperature of the container 10 may be the same as the step illustrated in FIG. 29 (A).

$Fe_3O_4$ particle are formed or precipitated in the container 10 while passing through the steps of FIG. 29 (A) to (C), and may be attached to the MWNT surface.

Referring to FIG. 29 (D), nanostructures i.e., MWNT+ $Fe_3O_4$ particle in the container 10 is cleaned and nanostructures may be collected by using a magnetic body 80. Then, the nanostructures may be dried at a temperature of about 80 to 100° C. in a predetermined drying apparatus.

As a result, a $Fe_3O_4$-MWNT composite 30 as shown in FIG. 29E may be obtained. The $Fe_3O_4$-MWNT composite 30 may correspond to the nanostructure 420 described with reference to FIG. 3. The $Fe_3O_4$-MWNT composite 30 may be dispersed in an organic solvent such as hexadecane (i.e., n-hexadecane), and at this time, ultrasonic waves may be applied for several minutes to several tens of minutes to improve dispersing power.

In FIG. 29, a method for forming the $Fe_3O_4$-MWNT composite 30 is shown as an example, and the method may be variously modified. In addition, the material of the nanostructure is not limited to the $Fe_3O_4$-MWNT composite, and various modifications may be possible. Therefore, the embodiment of the present application is not limited to the method of FIG. 29.

Figure 30:
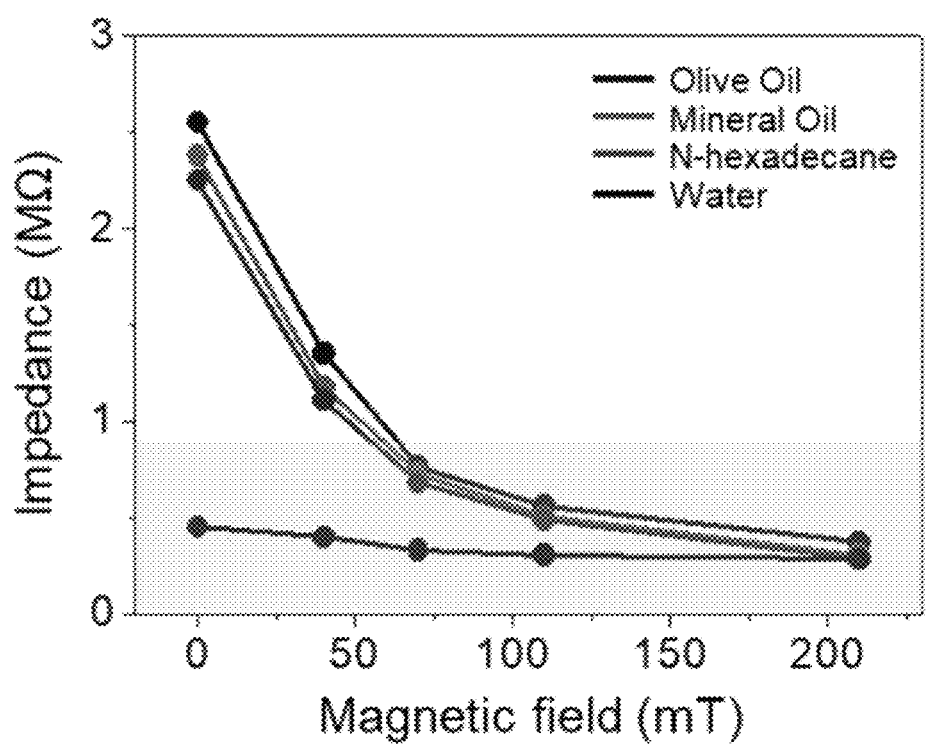
FIG. 30 is a graph showing electrical characteristics (impedance change characteristics according to a magnetic field) of $Fe_3O_4$-MWNTs in various solvents.

FIG. 30 is a graph showing electrical characteristics (impedance change characteristics according to a magnetic field) of $Fe_3O_4$-MWNTs in various solvents. Several skin compatible solvents may be applied to the NV-MED device according to the embodiment of the present invention. For example, mineral oil and olive oil with the dielectric constants similar to that of n-hexadecane may be suitable for the NV-MED device. Also, non-polar solvent may be more suitable for the NV-MED device for higher sensitivity to the magnetic field.

Figure 31:
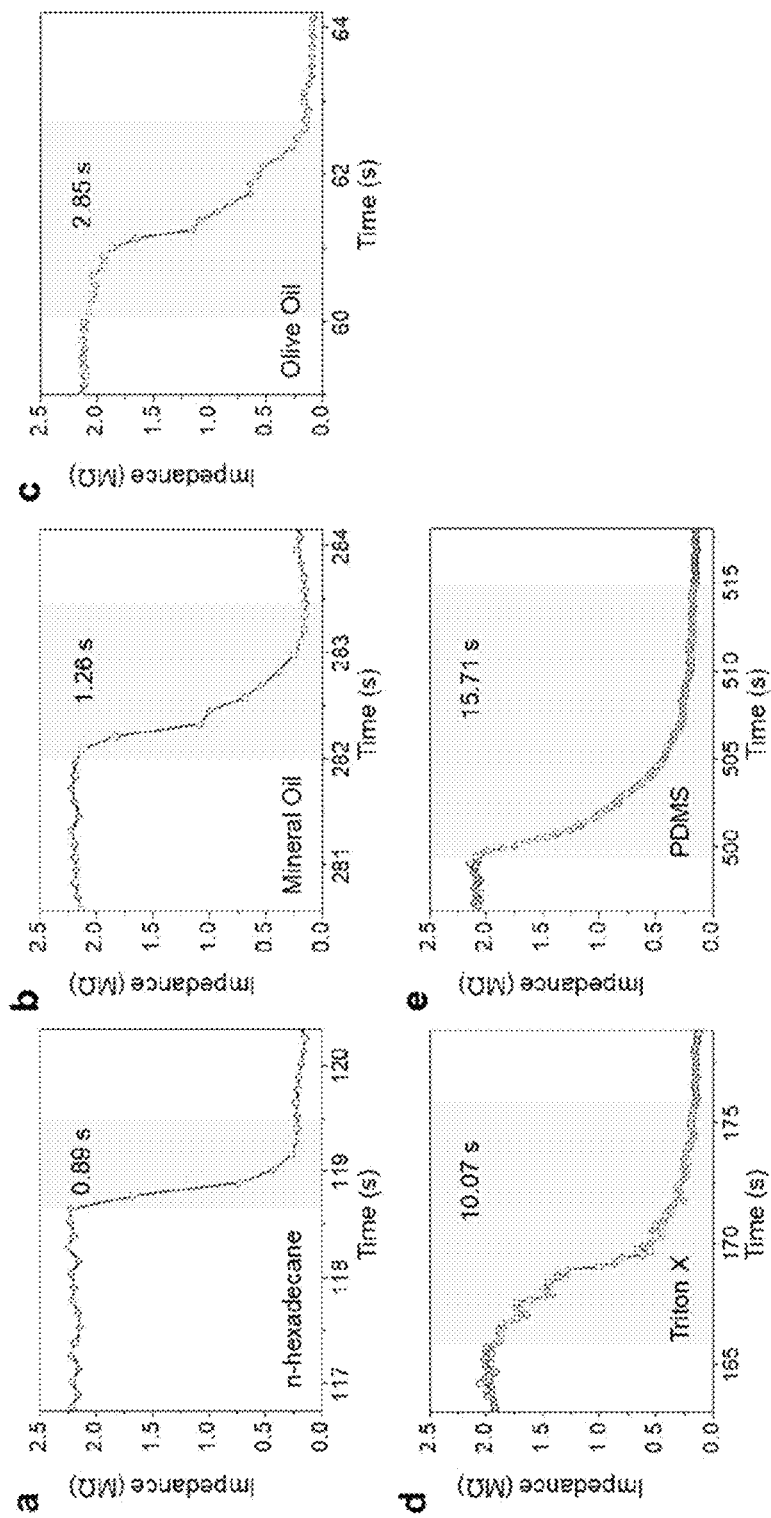
FIG. 31 is a graph showing electrical characteristics of $Fe_3O_4$-MWNTs in various solvents with different viscosities.

FIG. 31 is a graph showing electrical characteristics of $Fe_3O_4$-MWNTs in various solvents with different viscosities. That is, FIG. 31 shows impedance change characteristics of $Fe_3O_4$-MWNTs with various solvents of (a) n-hexadecane, (b) mineral oil, (c) olive oil, (d) triton X, (e) PDMS under magnetic field (210 mT). Depending on the viscosity of the solvent, the response time of the NV-MED device may be adjusted. The response time of the NV-MED device may be shorter as the viscosity of the solvent decreases.

Figure 32:
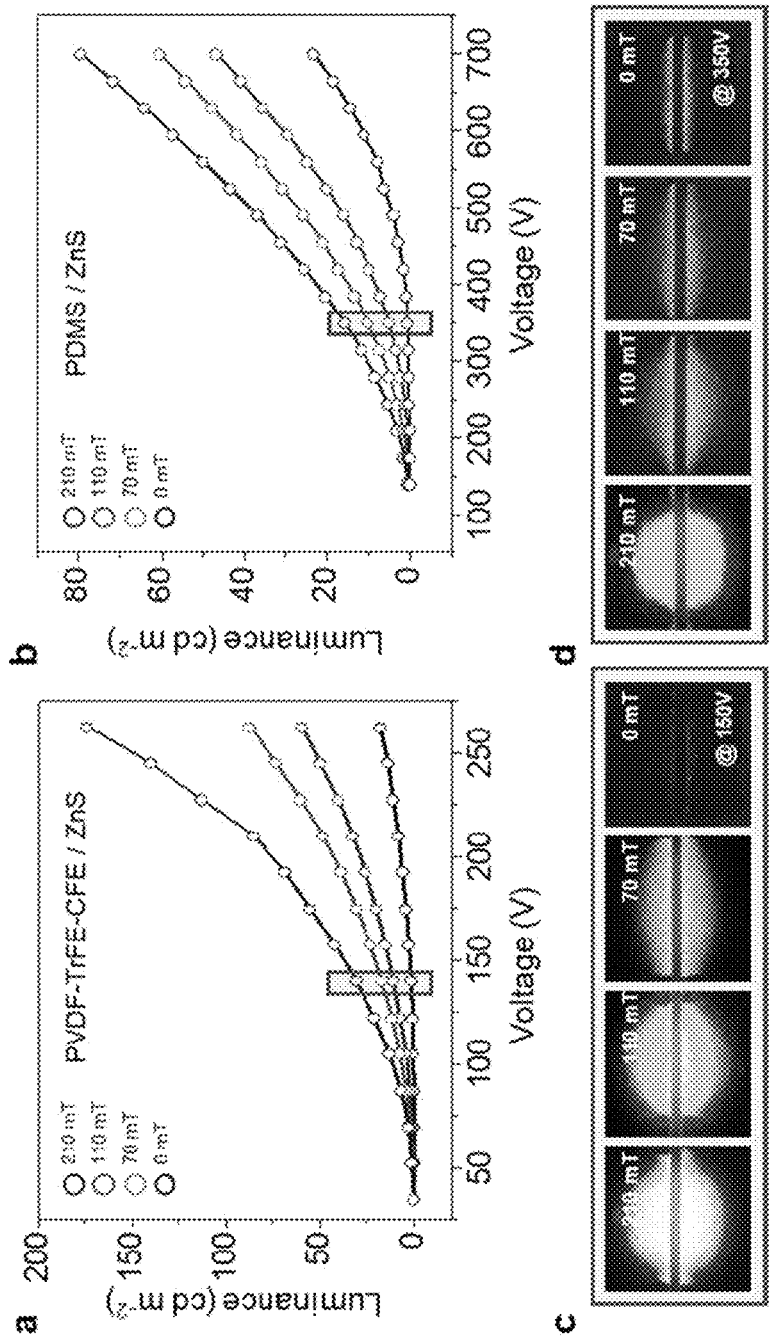
FIG. 32 is a graph showing luminance-voltage (L-V) characteristics of NV-MED devices with different magnetic fields, according to embodiments of the present invention.

FIG. 32 is a graph showing luminance-voltage (L-V) characteristics of NV-MED devices with different magnetic fields, according to embodiments of the present invention. In one example, an NV-MED device includes a ZnS:Cu/PVDF-TrFE-CFE composite layer as the light emission layer. In another example, an NV-MED device includes a ZnS:Cu/PDMS composite layer as the light emission layer. In FIG. 32, the graph (a) shows L-V characteristics of the NV-MED device with the ZnS:Cu/PVDF-TrFE-CFE composite layer under different magnetic fields, and the graph (b) shows L-V characteristics of the NV-MED device with the ZnS:Cu/PDMS composite layer under different magnetic fields. In FIG. 32, the photographic image (c) shows variation in EL intensity of the NV-MED device with the ZnS:Cu/PVDF-TrFE-CFE composite layer under different magnetic fields, and the photographic image (d) shows variation in EL intensity of an NV-MED with the ZnS:Cu/PDMS composite layer under different magnetic fields. The NV-MED device with ZnS:Cu/PVDF-TrFE-CFE may be operated at the voltage lower than that with ZnS:Cu/PDMS owing to the dielectric constant of PVDF-TrFE-CFE higher than that of PDMS. The current during the operation of the device may be very low, which may make it possible to safely apply the device as a skin-patchable device.

Figure 33:
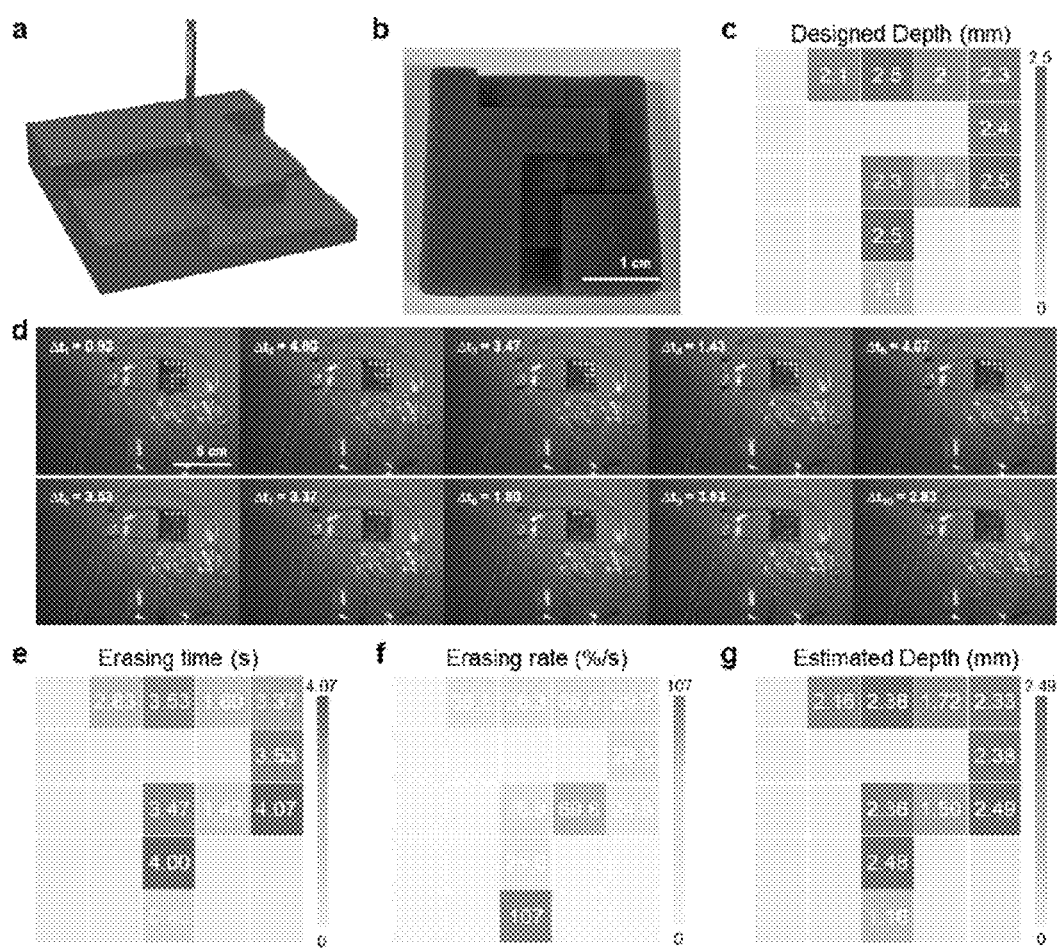
FIG. 33 is a diagram showing the results estimating in-vitro 3D motion tracking characteristics of the NV-MED device (i.e., NV-MED display) according to an embodiment of the present invention.

FIG. 33 is a diagram showing the results estimating in-vitro 3D motion tracking characteristics of the NV-MED device (i.e., NV-MED display) according to an embodiment of the present invention. In FIG. 33, (a) is a schematic diagram of a 3D printed tracking mould, (b) is a photograph image of a 3D printed tracking mould mounted on the NV-MED device, and (c) is a designed depth profile of 3D printed mould recorded on 5×5 NV-MED arrays. In addition, (d) shows captured photographs of NV-MED arrays mounted on a transparent human skull dummy upon moving the magnetic probe along the route of the mould. The time for each step is shown in the photograph (scale bars: 5 cm). In FIG. 33, (e) shows erasing time of the NV-MED device measured from each pixel array, (f) shows erasing rate of the NV-MED device calculated from erasing time of each pixel array, and (g) shows estimated depth profile of 3D motion tracking of magnetic probe. The results show almost similar estimated depth value to the designed depth. A 3D path was characterized by the method described in this specification and the results clearly show that the estimated 3D path by the NV-MEDs was almost identical with one designed by 3D printing.

Figure 34:
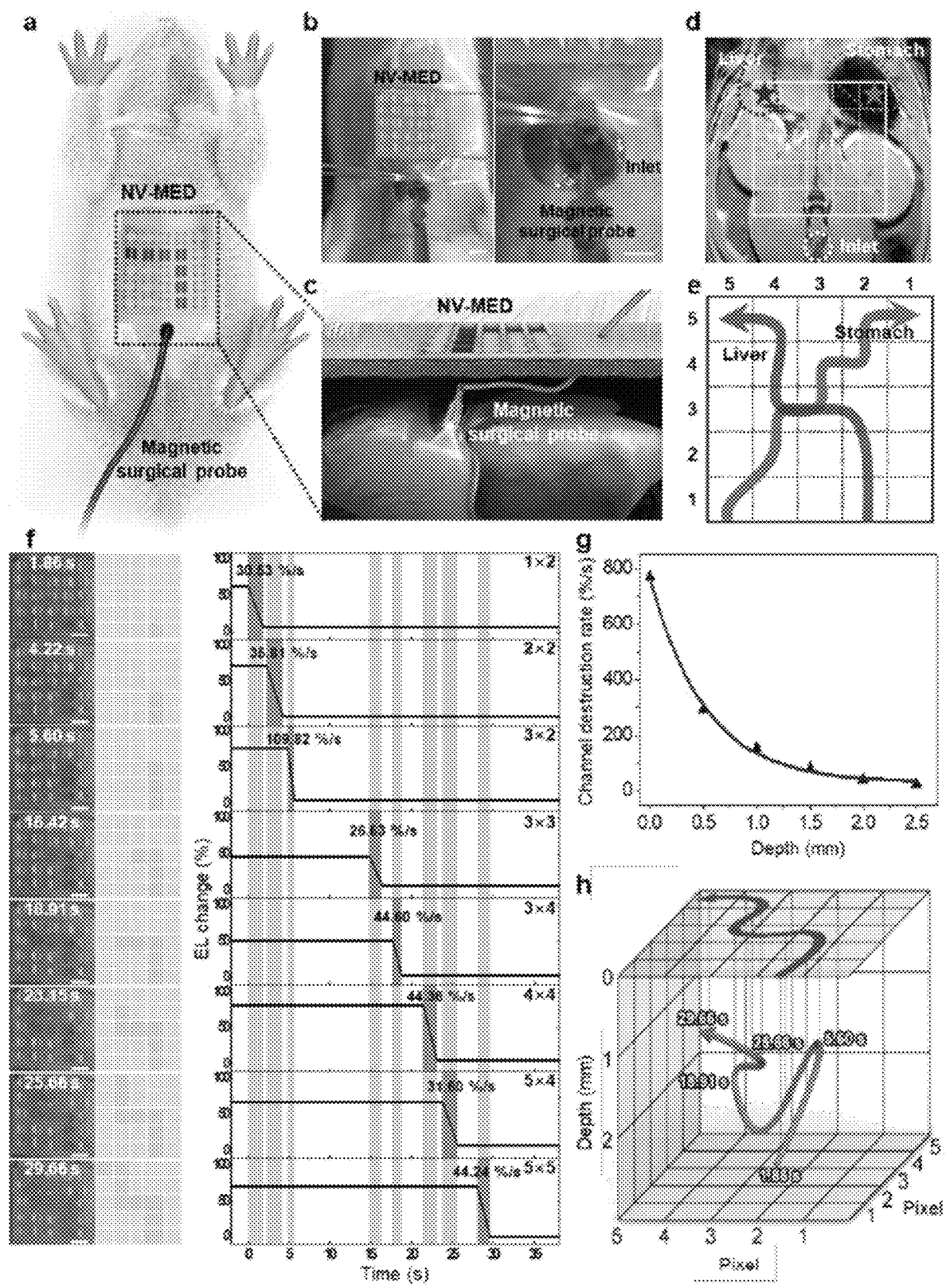
FIG. 34 is a diagram for explaining a patchable 3D motion tracking NV-MED display and its operating principle, according to an embodiment of the present invention.

FIG. 34 is a diagram for explaining a patchable 3D motion tracking NV-MED display and its operating principle, according to an embodiment of the present invention. In FIG. 34, (a) is a schematic diagram of a 3D motion tracking display with 5×5 NV-MED arrays applied to a medical experiment on a living body, (b) shows images of the NV-MED arrays mounted on the skin of a rat and the magnetic surgical probe entering the body through the inlet (scale bars: 5 mm), (c) is a close-up schematic view of the NV-MED array-mounted site showing the magnetic probe below the pixels of the NV-MED arrays, resulting in the erasure of the EL of each pixel. In addition, (d) is an MRI scan image of a rat abdominal cavity with the 5×5 grid. The positions of the liver and stomach were marked in red and blue, respectively. Also, (e) shows the estimated routes for liver and stomach surgery with the grid. In FIG. 34, (f) shows EL change in the pixels of the NV-MED arrays as a function of time upon moving the magnetic probe to the target liver. The NV-MED arrays mounted on a rat captured during the movement. The time for each step is shown in the photograph (scale bars: 5 mm) In FIG. 34, (g) shows variation in the channel destruction rate (erase rate) as a function of depth of the magnetic probe, and (h) shows three-dimensional plots of the route to the liver with the depth of the magnetic probe showing the actual path of the probe. As shown in FIG. 34, according to an embodiment of the present invention, a surgical display device for tracking motion (moving) of a magnetic surgical probe may be implemented. Accordingly, embodiments of the present invention may be advantageously applied to the implementation of a non-invasive or minimally invasive surgical device.

According to the above-described embodiments, it is possible to implement a light emission device (a magnetoactive light-emitting device) capable of sensing, visualizing, memorizing and displaying various magnetic field information as a single device. The magneto-interactive display using such a light-emitting device may be easily manufactured in a small size without a complicated and bulky connection structure through a conventional microprocessor. Therefore, according to the present embodiments, the magneto-interactive display may be easily fabricated as a wearable device. The light emission device described above may be applied to various human-interactive devices. In particular, since the light emission device has a function for storing the applied magnetic field information, and a function for storing information as a multi-level format, and for visualizing information as a multi-level format, it may be used in many fields as a magneto-interactive display having a nonvolatile memory function and a multi-level function. The light-emitting device described above may be implemented as a flexible device, has a touchless function for sensing a magnetic field without contact, and includes various other functions. Therefore, it may be applied to new functional device/apparatus such as soft robotics, contactless flexible electronic devices (contactless flexible electronics), microfluidics and bioelectronics in various ways.

In the present specification, preferred embodiments of the present invention have been disclosed, and although specific terms have been used, they are merely used as a general sense to easily describe the technological contents of the present invention and to enable a person skilled in the art enable to understand the invention, and it is not intended to be limiting the scope of the present invention. It is apparent to those skilled in the art to which the present invention pertains that other modifications based on the technological spirit of the present invention may be implemented in addition to the embodiments disclosed herein. It is to be understood to the person having a common knowledge in the related art that in connection with a light emission device, a method for manufacturing the same, and an electronic device including the light emission device described with reference to FIGS. 1 to 34 various kinds of substitutions, changes and modifications may be made ways within the scope of the technological spirit of the present invention. Therefore, the scope of the invention should not be determined by the described embodiments, but should be determined by the technological spirit described in the claims.

EXPLANATION OF SYMBOLS

*Explanation of Symbols of Main Parts in the Drawings*

| | |
|---|---|
| 100: substrate | 200A: first electrode |
| 200B: second electrode | 300: emission layer |
| 350: reception element | 400: magnetoactive fluid layer |
| 410: organic solvent | 420: nanostructure |
| 420a: conductive nanowire | 420b: magnetic nanoparticle |
| 500: cover layer | 600: power supply |
| 900: magnetic body | $f_1, f_2, f_3, f_{10}$: magnetic field |

What is claimed is:

1. A light emission device comprising,
a light emission layer;
a first electrode and a second electrode spaced apart from each other on a first surface side of the light emission layer; and
a magnetoactive fluid layer disposed on a second surface side of the light emission layer and having a plurality of nanostructures of which arrangement and distribution is configured to change according to an application of a magnetic field, and
wherein light emitting properties of the light emission layer are configured to be changed according to the arrangement and distribution of the plurality of nanostructures in the magnetoactive fluid layer, and
wherein the plurality of nanostructures are configured to form a conductive bridge adjacent to the light emission layer in response to application of a first magnetic field.

2. The light emission device of claim 1, wherein the plurality of nanostructures includes a conductive nanowire; and magnetic nanoparticle provided on a surface of the conductive nanowire.

3. The light emission device of claim 2, wherein the conductive nanowire includes carbon nanotube.

4. The light emission device of claim 2, wherein the magnetic nanoparticle includes $Fe_3O_4$.

5. The light emission device of claim 1, wherein the magnetoactive fluid layer includes an organic solvent and the plurality of nanostructures dispersed in the organic solvent.

6. The light emission device of claim 1, wherein after the arrangement and distribution of the plurality of nanostructures are set to a first state by application of a first magnetic field, the first state is substantially maintained even when the first magnetic field is removed.

7. The light emission device of claim 1, wherein the plurality of nanostructures are configured to eliminate the conductive bridge in response to application of a second magnetic field having a direction opposite to the first magnetic field.

8. The light emission device of claim 1, wherein the light emission layer includes an organic material layer and a light emitting element provided in the organic material layer.

9. The light emission device of claim 1, further comprising a reception element which provides an reception space in which the magnetoactive fluid layer is accommodated on the second surface side of the light emission layer.

10. The light emission device of claim 1, wherein the light emission device is an electroluminescence (EL) device driven by an alternating current AC signal.

11. The light emission device of claim 1, wherein the light emission device is a wearable device.

12. An electronic device including the light emission device described in claims 1.

13. The electronic device of claim 12, corresponding to at least one of a device sensing a magnetic field, a device visualizing a magnetic field, a device memorizing magnetic field information, and a display device using a magnetic field.

14. The electronic device of claim 12, the electronic device comprises a surgical display device for tracking motion of a magnetic surgical probe.

15. A method for manufacturing a light emission device comprising,
    forming a first electrode and a second electrode spaced apart from each other on a substrate;
    forming a light emission layer on the first and second electrodes; and
    forming a magnetoactive fluid layer including a plurality of nanostructures on the light emission layer, arrangement and distribution of the plurality of nanostructures being changed by application of a magnetic field, and
    wherein the plurality of nanostructures are configured to form a conductive bridge adjacent to the light emission layer in response to application of a first magnetic field.

16. The method for manufacturing a light emission device of claim 15, wherein the plurality of nanostructures include conductive nanowire and magnetic nanoparticle provided on surfaces of the conductive nanowire.

17. The method for manufacturing a light emission device of claim 15, further comprising forming a reception element which provides an reception space in which the magnetoactive fluid layer is accommodated.

18. The method for manufacturing a light emission device of claim 15, wherein the plurality of nanostructures are configured to eliminate the conductive bridge in response to application of a second magnetic field having a direction opposite to the first magnetic field.

* * * * *